(12) United States Patent
Matsunaga

(10) Patent No.: US 9,226,015 B2
(45) Date of Patent: Dec. 29, 2015

(54) MOBILE TERMINAL, TELEVISION BROADCAST RECEIVER, AND DEVICE LINKAGE METHOD

(71) Applicant: Panasonic Corporation, Osaka (JP)

(72) Inventor: Shigeki Matsunaga, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 14/353,385

(22) PCT Filed: Dec. 19, 2012

(86) PCT No.: PCT/JP2012/008103
§ 371 (c)(1),
(2) Date: Apr. 22, 2014

(87) PCT Pub. No.: WO2013/111239
PCT Pub. Date: Aug. 1, 2013

(65) Prior Publication Data
US 2014/0282728 A1    Sep. 18, 2014

(30) Foreign Application Priority Data

Jan. 26, 2012   (JP) .................................. 2012-014619

(51) Int. Cl.
*H04N 5/445* (2011.01)
*H04N 21/422* (2011.01)
(Continued)

(52) U.S. Cl.
CPC .......... *H04N 21/42224* (2013.01); *G06F 3/041* (2013.01); *G06F 3/0488* (2013.01); *G06F 13/00* (2013.01); *H04M 1/72533* (2013.01); *H04N 21/482* (2013.01); *G06F 2203/04807* (2013.01)

(58) Field of Classification Search
CPC ....................... H04N 21/482; H04N 21/42224
See application file for complete search history.

(56) References Cited

U.S. PATENT DOCUMENTS 8,464,184 B1 *   6/2013   Cook et al. .................... 715/863
2007/0146347 A1 *   6/2007   Rosenberg .................... 345/173
(Continued)

FOREIGN PATENT DOCUMENTS

EP    2 192 478 A2    6/2010
JP    2010-182046    8/2010
(Continued)

OTHER PUBLICATIONS

International Search Report issued Apr. 2, 2013 in International Application No. PCT/JP2012/008103.
(Continued)

*Primary Examiner* — Junior Mendoza
(74) *Attorney, Agent, or Firm* — Wenderoth, Lind & Ponack, L.L.P.

(57) ABSTRACT

A mobile terminal capable of giving an instruction for a device linkage by simple operations, without any special hardware. The mobile terminal which is connected to a TV through a communication path includes: a communication I/F unit for communicating with the TV, a storage unit which stores content to be displayed on the TV; a display unit having a touch pad and a display screen; and a control unit which displays, on the display screen, a content icon associated with the content. When detecting that the content icon is pressed and held and then is flicked on the display unit, the control unit reads the content from the storage unit and transmit it to the TV through the communication I/F unit, so that the content is displayed on the TV.

4 Claims, 16 Drawing Sheets

(51) Int. Cl.
*G06F 3/0488* (2013.01)
*G06F 13/00* (2006.01)
*G06F 3/041* (2006.01)
*H04N 21/482* (2011.01)
*H04M 1/725* (2006.01)

(56) References Cited

U.S. PATENT DOCUMENTS

| | | | |
|---|---|---|---|
| 2008/0152263 A1* | 6/2008 | Harrison | 382/313 |
| 2009/0276439 A1* | 11/2009 | Rosenblatt et al. | 707/10 |
| 2010/0122194 A1 | 5/2010 | Rogers | |
| 2010/0149096 A1* | 6/2010 | Migos et al. | 345/158 |
| 2010/0156812 A1* | 6/2010 | Stallings et al. | 345/173 |
| 2010/0205628 A1 | 8/2010 | Davis et al. | |
| 2011/0083111 A1* | 4/2011 | Forutanpour et al. | 715/863 |
| 2011/0092222 A1* | 4/2011 | Kuo et al. | 455/456.1 |
| 2011/0163944 A1* | 7/2011 | Bilbrey et al. | 345/156 |
| 2011/0285658 A1 | 11/2011 | Homma et al. | |
| 2011/0296289 A1 | 12/2011 | Tokashiki | |
| 2012/0254793 A1* | 10/2012 | Briand et al. | 715/800 |
| 2013/0016858 A1 | 1/2013 | Masaki et al. | |
| 2013/0191875 A1* | 7/2013 | Morris et al. | 725/109 |

FOREIGN PATENT DOCUMENTS

| | | |
|---|---|---|
| JP | 2011-90673 | 5/2011 |
| JP | 2011-248497 | 12/2011 |
| WO | 2011/125831 | 10/2011 |

OTHER PUBLICATIONS

European Search Report mailed Jun. 10, 2015, in the corresponding European Application No. 12866773.0.

Extended European Search Report mailed Nov. 17, 2015 in corresponding European Patent Application No. 12866773.0.

* cited by examiner

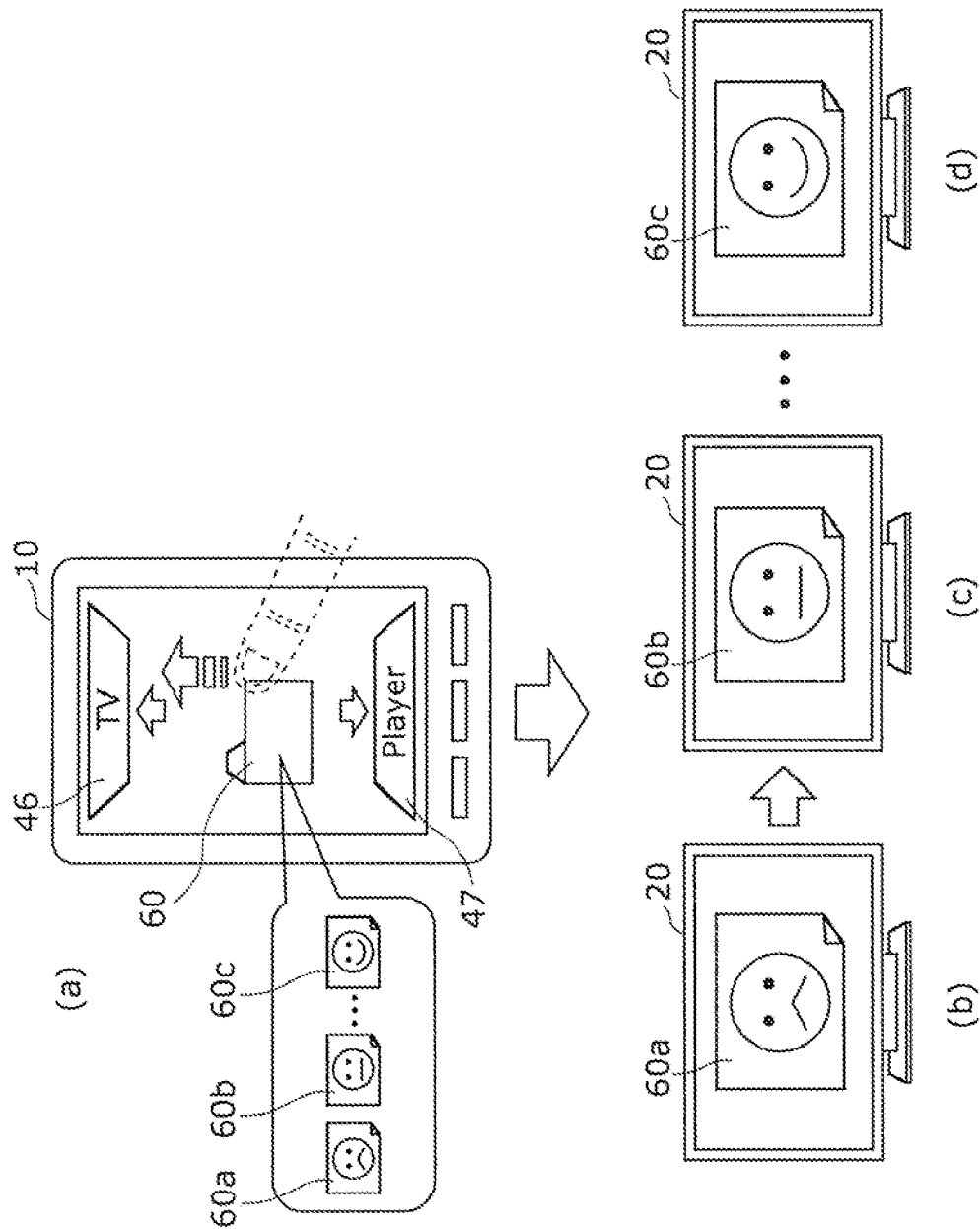

FIG. 13B
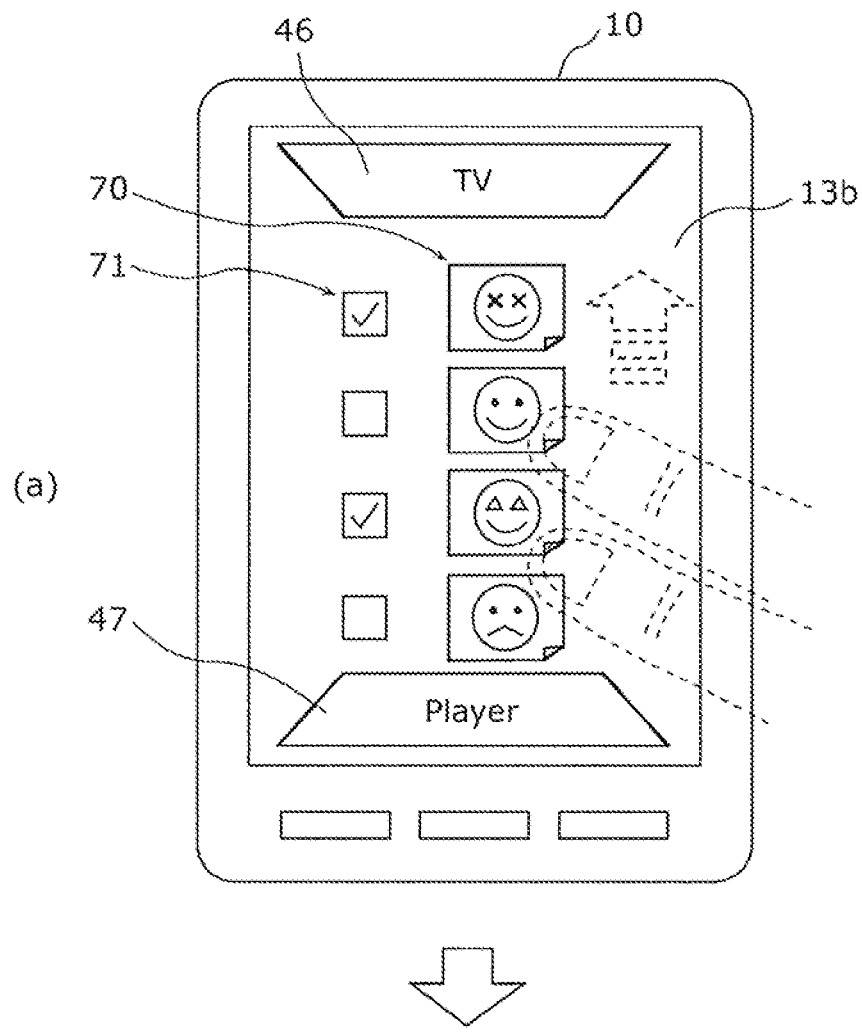
(a)
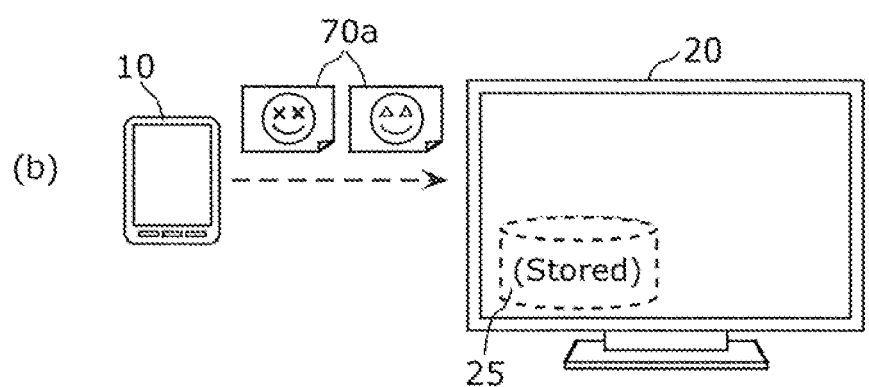
(b)

FIG. 14A
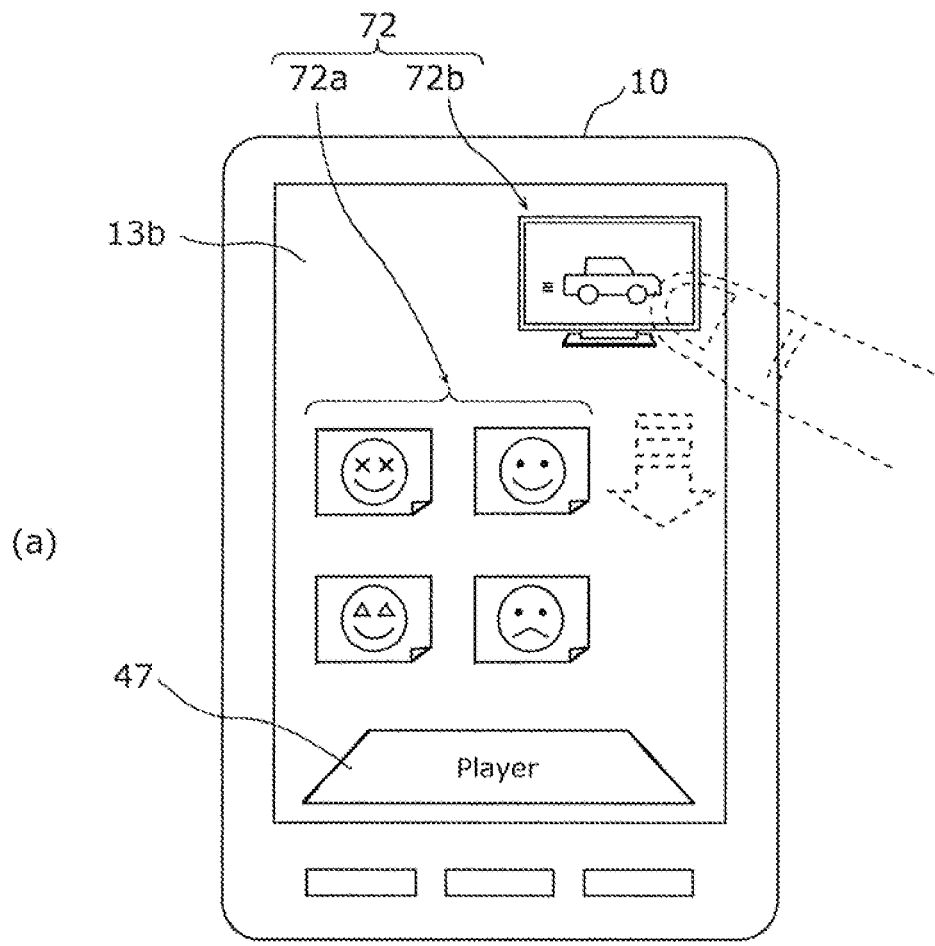
(a)
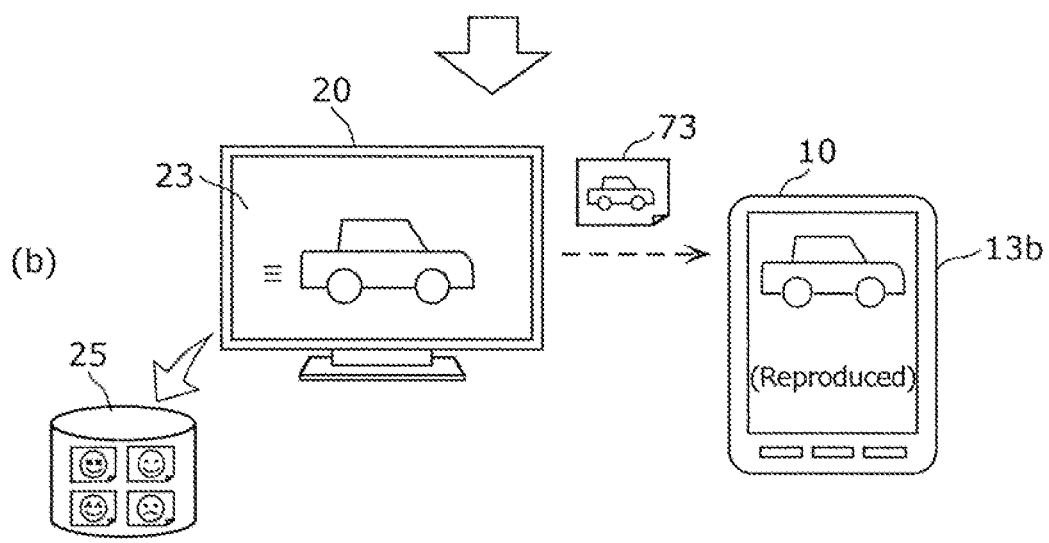
(b)

MOBILE TERMINAL, TELEVISION BROADCAST RECEIVER, AND DEVICE LINKAGE METHOD

TECHNICAL FIELD

The present disclosure relates to a mobile terminal, a television broadcast receiver, and a method for linking these devices, and in particular to a user interface which is of a mobile terminal mounting a touch panel and is related to a device linkage with an external device.

BACKGROUND OF INVENTION

Background Art

Recently, various kinds of techniques related to a linkage between a mobile terminal and an external device (for example, a television broadcast receiver, hereinafter also simply referred to as "TV") have been proposed with a spread of mobile terminals mounting a touch panel represented by smart phones and tablet PCs (for example, see Patent Literature 1). Here, a "touch panel" is an electronic component in which a display device such as a liquid crystal panel and a position input device such as a touch pad are combined, and is also referred to as a touch screen.

In Patent Literature 1, location information of a Web page is transmitted from a mobile terminal to a TV by an operation using the mobile terminal, and the TV obtains the Web page through the Internet based on the location information and displays the Web page. In this way, a device linkage for allowing the mobile terminal to display the content onto the large screen is realized.

CITATION LIST

Patent Literature

[PTL 1]
Japanese Laid-open Patent Application Publication No. 2010-182046

SUMMARY OF INVENTION

However, the technique of Patent Literature 1 requires that an object is selected on a touch panel provided on a front surface of a mobile terminal, and sequentially that an instruction for a transmission to the TV is given using a touch pad provided on a back surface of the mobile terminal. In other words, the technique requires touch operations on the respective front and back surfaces of the mobile terminal, causing a problem that the operations are complicated. Furthermore, the technique requires that touch sensors (the touch panel and the touch pad) are provided on the respective front and back surfaces of the mobile terminal.

It is to be noted that, when trying to realize such a device linkage using a normal mobile terminal (a touch panel is mounted on only a front surface of a touch panel), two steps are required which are an operation for selecting an object displayed on the touch panel and an operation for instructing a transmission of the selected object to an external device. As an operation for realizing such two steps on the touch panel, a flick is conceivable. However, a flick scrolls a display window, and thus cannot use a special instruction for transmitting the selected object to the external device. Here, a "flick" is an operation of touching a touch panel with a finger or a pen and sliding the finger or the pen a little, or an operation of touching and quickly swiping the touch panel.

In view of the problem, the present disclosure has an object to provide a mobile terminal etc. capable of giving an instruction for a device linkage by simple operations without mounting, on a mobile terminal, special hardware such as the touch sensors on the respective front and back surfaces of the mobile terminal.

In order to achieve the above object, a mobile terminal according to an aspect of the present disclosure is a mobile terminal which is connected to a display device through a communication path, the mobile terminal including: a communication interface unit for communicating with the display device; a storage unit configured to store content to be displayed on the display device; a display unit having a touch pad and a display screen; and a control unit configured to display, on the display screen, a content icon which is an icon associated with the content, wherein when detecting that the content icon is pressed and held and then is flicked on the display unit, the control unit is configured to read the content from the storage unit and transmit the content to the display device through the communication interface unit, so that the content is displayed on the display device.

A mobile terminal can be realized which is capable of giving an instruction for a device linkage by simple operations without mounting thereon any special hardware such as the touch sensors on the respective front and back surfaces thereof. In addition, a device linkage between the mobile terminal and an external device is realized.

BRIEF DESCRIPTION OF INVENTION

FIG. 11 is a diagram illustrating a second variation of the embodiment of the present disclosure.

FIG. 13B is a diagram showing an example of an operation performed with two fingers (an example of an upload operation) in the fifth variation.

FIG. 14A is a diagram showing an example of an operation performed with a finger in a sixth variation (an example of a download operation) in the embodiment.

DETAILED DESCRIPTION OF INVENTION

Summary of Disclosure

Figure 1:
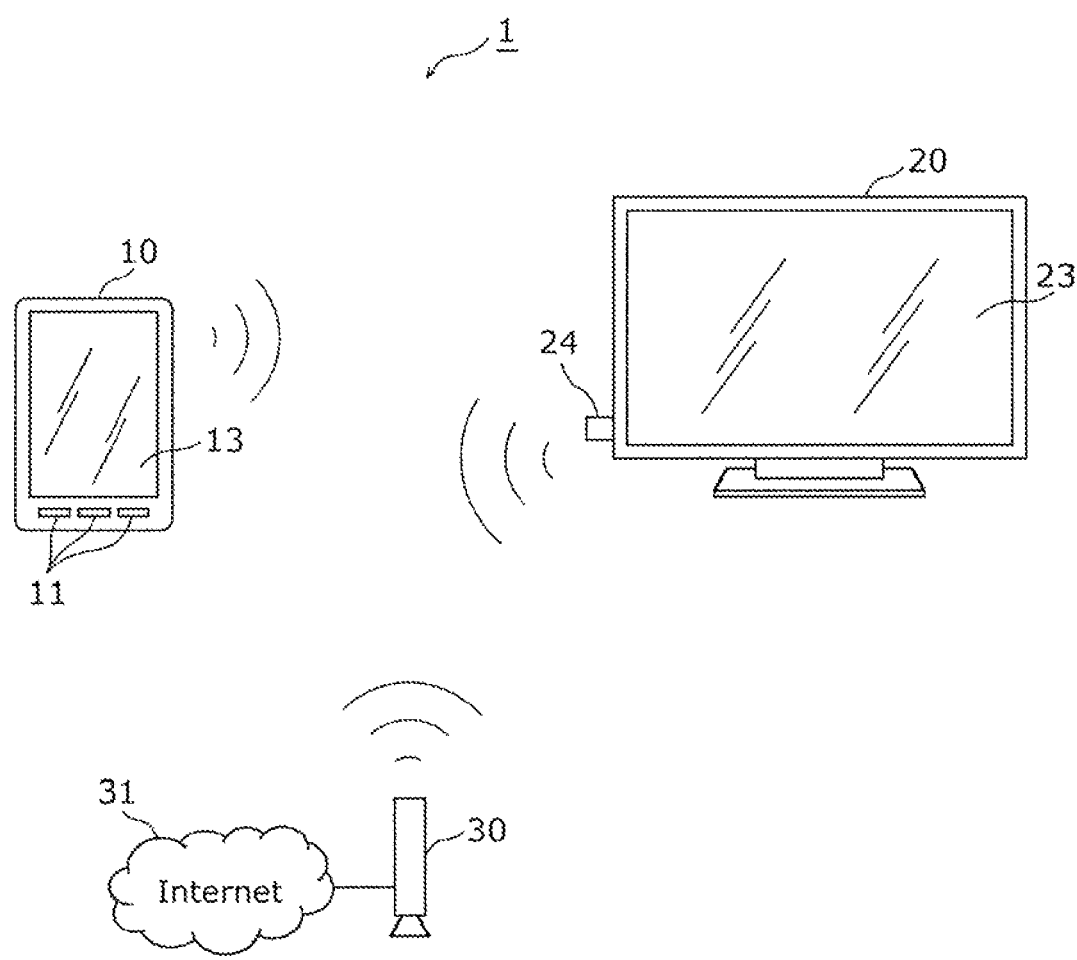
FIG. 1 is a diagram showing a configuration of a communication system in this embodiment of the disclosure.

In order to achieve the above object, a mobile terminal according to an aspect of the present disclosure is a mobile terminal which is connected to a display device through a communication path, the mobile terminal including: a communication interface unit for communicating with the display device; a storage unit configured to store content to be displayed on the display device; a display unit having a touch pad and a display screen; and a control unit configured to display, on the display screen, a content icon which is an icon associated with the content, wherein when detecting that the content icon is pressed and held and then is flicked on the display unit, the control unit is configured to read the content from the storage unit and transmit the content to the display device through the communication interface unit, so that the content is displayed on the display device.

In this way, when the content icon is pressed and held and then is flicked, the content associated with the content icon is transmitted to the external display device. Thus, it is possible to realize a device linkage by the simple operations without causing a scroll etc. of the display screen by a normal flick operation (or a swipe operation) in which a content icon is pressed (shortly) and then flicked. Here, a "swipe" (or a "swipe operation") is an operation of stroking an icon etc. on a display screen in a particular direction with a finger touched thereon.

Here, when detecting that the content icon is pressed and held, the control unit may be configured to display a display device icon which is an icon associated with the display device, at a predetermined position on the display screen, and transmit the content when the content icon is flicked toward the display device icon.

In this way, guides for content transmission are displayed when the content icon is pressed and held. Thus, the user can easily find out the flick direction.

In addition, the control unit may further be configured to: display a mobile terminal icon which is an icon associated with the mobile terminal, at a predetermined position on the display screen when detecting that the content icon is pressed and held; and read the content from the storage unit and display the content on the display screen when the content icon is flicked toward the mobile terminal icon.

In this way, since operations of the mobile terminal are switched depending on the flick direction, the user can selectively perform various kinds of processing including the device linkage by the simple operations.

In addition, the control unit may further be configured to transmit the content when the content icon is dragged to the display device icon, and display the content when the content icon is dragged to the mobile terminal icon In this way, it is possible to give the same instruction to the mobile terminal by dragging the content icon instead of flicking it, increasing the user-friendliness in user operations.

In addition, the storage unit may further be configured to store a first Web page, and the control unit may further be configured to read the first Web page from the storage unit and display the first Web page on the display screen; and when detecting that the first Web page is pressed and held and then is flicked in a first direction on the display unit, transmit location information of the first Web page to the display device through the communication interface unit, so that the first Web page is displayed on the display device.

In this way, it is only necessary to press and hold and then flick a point on the Web page displayed on the mobile terminal so as to browse the Web page using the external display device.

In addition, when detecting that the first Web page is pressed and held and then is flicked in a second direction on the display unit, the control unit may further be configured to: direct the display device to transmit location information of the second Web page displayed on the display device so that the second Web page is displayed on the display screen; receive the location information transmitted from the display device through the communication interface unit; obtain the second Web page based on the received location information; and display the second Web page on the display screen.

In this way, by changing the flick direction, it is possible to select one of displaying, on the external display device, the Web page displayed on the mobile terminal, and displaying, on the mobile terminal, the Web page displayed on the external display device (in other words, exchange the Web pages).

In addition, the control unit may further be configured to: display a link icon associated with location information of a third Web page on the display screen; and when detecting that the link icon is pressed and held and then is flicked on the display unit, transmit the location information to the display device through the communication interface unit, so that the third Web page is displayed on the display device.

In this way, it is possible to display, on the external display device, the Web page which is the link destination and displayed on the mobile terminal, only by pressing and holding and then flicking the link information of the Web page. Thus, the user can browse the Web page at the link destination using the external display device with the display state on the mobile terminal maintained.

In addition, the storage unit may be configured to store a plurality of content items, and the control unit may be configured to: display, on the display screen, a folder icon which is an icon associated with the plurality of content items; and when detecting that the folder icon is pressed and held on the display unit, read the plurality of content items from the storage unit and transmit the plurality of content items to the display device through the communication interface unit, so that the plurality of content items are displayed on the display device sequentially or at sight.

In this way, it is possible to display, on the external display device, the plurality of content items stored in a folder only by pressing and holding and then flicking the folder icon displayed on the mobile terminal. Thus, the plurality of content items do not need to be transmitted one by one, which simplifies the content transmission operations.

In addition, the control unit may further be configured to: when detecting that the content icon is pressed and held with a finger and then is flicked in a third direction, transmit the content to the display device and cause the display device to display the content; and when detecting that the content icon is pressed with two fingers and then is flicked in the third direction, transmit the content to the display device and cause the display device to store the content internally. In this way, the user can upload the content inside the mobile terminal from the mobile terminal to the display device by the one- or two-finger flick in the particular direction, and switch the post-upload processes in the display device, that are, displaying (reproducing) the content on the display device and storing the content in the display device.

In addition, the control unit may further be configured to: display, on the display screen, a display device content icon which is an icon associated with at least one of content stored in the display device and content displayed on the display device; and when detecting that the display device content icon is pressed, obtain the content associated with the display device content icon from the display device. In this way, it is possible to download the content stored in the display device, or the content displayed on the display device, from the display device to the mobile terminal.

More specifically, the control unit may be configured to: when detecting that the display device content icon is pressed and held with a finger and then is flicked in a fourth direction, obtain, from the display device, the content associated with the display device content icon and display the content on the display screen; and when detecting that the display device content icon is flicked with two fingers in the fourth direction, obtain, from the display device, the content associated with the display device content icon and store the content in the storage unit. In this way, the user can download the content inside the display device from the display device to the mobile terminal by the one- or two-finger flick in the particular direction, and switch the post-download processes in the mobile terminal, that are, displaying (reproducing) the content on the mobile terminal and storing the content in the mobile terminal.

Furthermore, in order to achieve the above object, a mobile terminal according to an aspect of the present disclosure is a television broadcast receiver which is connected to a mobile terminal through a communication path, the television broadcast receiver including: a display screen; a receiving unit configured to receive content including a broadcast program; a communication interface unit for communicating with the mobile terminal; and a control unit configured to display the content received by the receiving unit on the display screen, and notify the mobile terminal that the content is displayed on the display screen through the communication interface, wherein when receiving a transmission request for the content displayed on the display screen from the mobile terminal through the communication interface unit, the control unit is further configured to transmit the content to the mobile terminal through the communication interface unit.

In this way, when the fact that the content is displayed on the display device is notified to the mobile terminal and a transmission request is made by the mobile terminal, the content is transmitted from the display device to the mobile terminal. Thus, the mobile terminal can download the content displayed on the display device at the time point.

Furthermore, in order to achieve the above object, a device linkage method by a mobile terminal which is connected to a mobile terminal through a communication path, wherein the mobile terminal includes: a communication interface unit for communicating with the display device; a storage unit configured to store content to be displayed on the display device; and a display unit having a touch pad and a display screen, the device linkage method including: displaying, on the display screen, a content icon which is an icon associated with the content; and when detecting that the content icon is pressed and held and then is flicked on the display unit, reading the content from the storage unit and transmitting the content to the display device through the communication interface unit, so that the content is displayed on the display device.

In this way, it is only necessary to perform simple operations of pressing and holding and then flicking the content icon displayed on the mobile terminal so as to transmit the content associated with the content icon to the external display device without causing a scroll etc. on the display screen. Accordingly, the device linkage is realized by the simple operations.

The subject of the present disclosure can be realized not only as a device and a method but also as a program for causing a computer (or a processor) to execute the steps of the method, a recording medium such as a computer-readable CD-ROM having the program recorded thereon, information, data and/or a signal which represent the program, etc. The program, information, data, and/or signal can be distributed through communication networks such as the Internet etc.

Embodiments

Hereinafter, embodiments of the present disclosure are described in detail with reference to the drawings. It is to be noted that each of the embodiments described below shows a preferred specific example. The numerical values, shapes, structural elements, the arrangement and connection of the structural elements, steps, the processing order of the steps etc. shown in the following exemplary embodiments are mere examples, and, therefore do not limit the scope of the appended Claims and their equivalents. The subject of the present disclosure is defined by the Claims. Therefore, among the structural elements in the following exemplary embodiments, structural elements not recited in any one of the independent claims that present the most generic concept of the subject of the present disclosure are not always necessary for achieving the object of the present disclosure and described as the structural elements of the preferred embodiments. In other words, the Inventor(s) provides the following descriptions and the attached drawings in order to help persons skilled in the art to fully understand the present disclosure, without any intension to limit the subject matters described in the Claims thereby.

FIG. 1 is a diagram showing a configuration of a communication system 1 in this embodiment. The communication system 1 is an example of a communication system which enables a device linkage in which content stored in a mobile terminal 10 is transmitted to a display device (here, a TV 20) which is an external device, and causes the TV 20 to display the content. Here, the communication system 1 includes the mobile terminal 10, the TV 20, and a wireless router 30 which are connected through a wireless LAN in a home.

The mobile terminal 10 is an example of a mobile terminal which is connected to the display device (here, the TV 20), and is a smart phone, a tablet PC, or the like which includes a display unit 13 such as a touch panel and a button 11.

The TV 20 is an example of a display device connected to the mobile terminal 10 through a communication path, and functions as an external device for a device linkage with the mobile terminal 10 through the communication path by mounting not only a function as a television broadcast receiver which displays a received broadcast program on a display screen 23 but also as a CPU which executes an application program and a communication interface (I/F) unit 24 etc. for wireless LAN.

The wireless router 30 is a gateway device between the Internet 31 which is a public network and a wireless LAN which is a communication path in a home. It communicates with the mobile terminal 10 and the TV 20 through the wireless LAN, and thereby enables communication between the mobile terminal 10 and the TV 20 and communication between (i) the mobile terminal 10 and the TV 20 and (ii) the Internet 31. Here, the Internet 31 is a computer network in which computers are connected to each other using an Internet protocol technique.

Figure 2A:
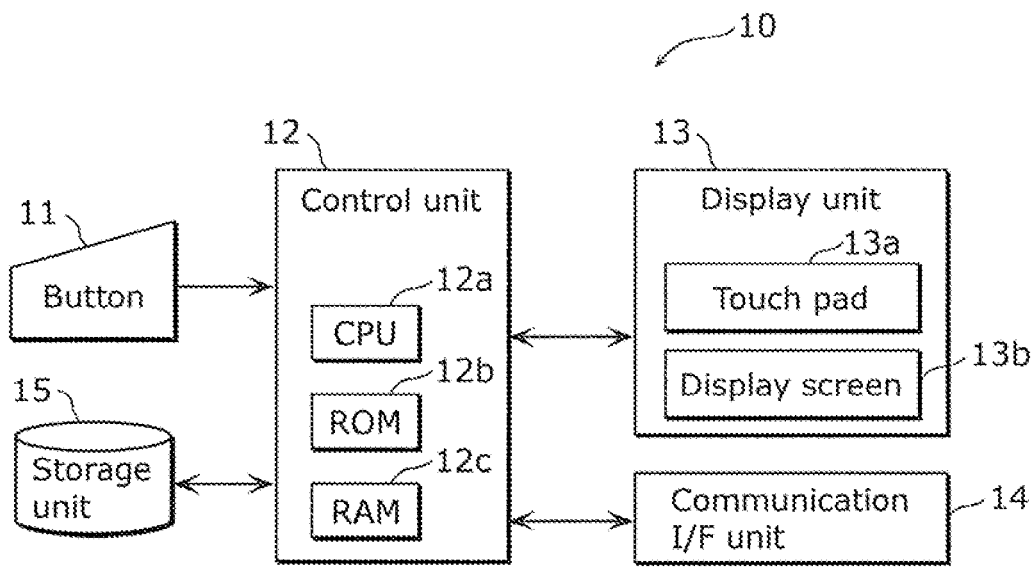
FIG. 2A is a block diagram showing a structure of a mobile terminal in FIG. 1.

FIG. 2A is a block diagram showing a structure of the mobile terminal 10 in FIG. 1. This mobile terminal 10 is a mobile terminal having a device linkage function, and includes a button 11, a control unit 12, a display unit 13, a communication interface (I/F) unit 14, and a storage unit 15.

The button 1 is a hardware button which functions as an input unit for receiving a user instruction.

The display unit 13 is a touch panel having a display screen 13b which is, for example, a touch pad 13a, a liquid crystal panel, or the like.

The communication I/F unit 14 is an example of a communication interface unit for communicating with the TV 20 through the wireless router 30 or accessing the Internet 31, and is for example an interface card for wireless LAN. Here, the communication I/F unit 14 may include a function of a telephone which enables conversation through a mobile telephone network such as the third generation mobile phone network (3G).

The storage unit 15 is an example of a storage unit which stores content to be displayed on the TV 20 as a device linkage, and is for example a non-volatile memory which stores content such as a photograph a video, and a Web page.

The control unit 12 is an example of a control unit which displays, on the display screen 13b, a content icon which is an icon associated with content stored in the storage unit 15. The control unit 12 includes a button 11, a CPU 12a for controlling the display unit 13 and the communication I/F unit 14, a ROM 12b, and a RAM 12c. The ROM 12b is a read-only memory storing an Operating System (OS), programs such as an application program, and data which realize functions of the control unit 12. The CPU 12a is a processor which executes the program stored in the ROM 12b. The RAM 12c is a temporary storage area which functions as a working area for the CPU 12a to execute the program. Here, all or part of the aforementioned programs and data may be stored in the storage unit 15 which functions as the non-volatile memory.

Here, "icons" are image objects which are displayed on the display screen 13b, and include not only a pictorial one but also a symbol, a character, a still image, a video, a thumbnail image, and an image object configured as a mixture of the symbol etc.

Here, the control unit 12 performs processes below in a device linkage.

When detecting that a content icon is pressed and held and then is flicked on the display unit 13, the control unit 12 reads the content from the storage unit 15 so that the content corresponding to the content icon is displayed on the TV 20, and transmits it to the TV 20 through the communication I/F unit 14 and the wireless router 30. Here, when the content is transmitted from the mobile terminal 10, the TV 20 receives the content and executes an application program which is displayed on the display screen thereof. Here, a "long press" is an operation of holding a touch with a finger or a pen, on the display unit 13 (strictly, on the touch pad 13a) over a predetermined time duration (for example, 0.5 second), and is differentiated from a normal operation ("tap") of touching for a time duration shorter than the predetermined time duration.

Here, depending on pre-setting in the mobile terminal 10 (when setting for turning on display guides is made in advance), when detecting a long press of a content icon, the control unit 12 displays a TV icon which is an icon associated with the TV 20 and a mobile terminal icon which is an icon associated with the mobile terminal 10, on predetermined positions on the display screen 13b as guide display. In this embodiment, the TV icon is displayed at an upper part (upper end) and the mobile terminal icon is displayed at a lower part (lower end) of the display screen 13b.

When the pressed and held content icon is flicked toward the TV icon, the control unit 12 reads the content associated with the content icon from the storage unit 15, and transmits it to the TV 20 through the communication I/F unit 14 and the wireless router 30. On the other hand, when the pressed and held content icon is flicked toward the mobile terminal icon, the control unit reads the content associated with the content icon from the storage unit 15, and displays it on the display screen 13b. It is assumed here that the content associated with the content icon is a video. In the case where the content icon is flicked toward the TV icon, the video is transmitted to the TV 20, and the TV 20 reproduces the video. In the opposite case where the content icon is flicked toward the mobile terminal icon, the video is reproduced by the mobile terminal 10.

It is to be noted that the content icon is not pressed and held (in other words, pressed shortly) and then is flicked, the control unit 12 performs a normal user interface process (for example, a scroll of a display window in the case where a flick operation is performed) depending on a scene and a touch position.

With the function of the mobile terminal 10, the user can display or reproduce associated content by the TV 20 having a large display screen or the mobile terminal 10 without scrolling the display window, only by performing simple operations of pressing and holding and then flicking the content icon displayed on the mobile terminal 10. Thus, the user can use the TV 20 as if it is a large display connected to the mobile terminal 10.

Here, when the two step operations (a long press and a flick) on the content icon are replaced with a long press and a drag on the content icon, the control unit 12 may perform the same processes as in the case of performing the flick. In other words, the control unit 12 may transmit the content when the content icon is pressed and held and then is dragged to the TV icon, and display or reproduce the content when the content icon is pressed and held and then is dragged to the mobile terminal icon.

When the mobile terminal 10 and the TV 20 access the Internet 31 through the wireless router 30, in other words, when the mobile terminal 10 and the TV 20 display Web pages, it is possible to display a Web page displayed on one of the sides also on the other side by performing similar operations using the mobile terminal 10.

In other words, when detecting that the Web page stored in the RAM 12c or the storage unit 15 is read and displayed on the display screen 13b, and the Web page is pressed and held and then is flicked in a first direction on the display unit 13, the control unit 12 transmits the Uniform Resource Locator (URL) which is location information of the Web page to the TV 20 through the communication I/F unit 14 and the wireless router 30, so that the Web page is displayed on the TV 20. On the other hand, when detecting that the Web page is pressed and held and then is flicked in a second direction (different from the first direction) on the display unit 13, the control unit 12 directs the TV 20 to transmit the URL of the Web page displayed on the TV 20 so that the Web page displayed on the TV 20 is displayed on the display screen 13b, receives the URL of the Web page transmitted from the TV 20 through the communication I/F unit 14, obtains the Web page corresponding to the received URL through the Internet 31, and displays the Web page on the display screen 13b.

Here, the first and second directions may be predetermined directions (for example, upward and downward directions) on the display screen 13b, or directions in each of which the aforementioned guide display is present (for example, a direction in which the TV icon is displayed and a direction in which the mobile terminal icon is displayed).

In addition, the Web page transmitted from the mobile terminal 10 (or the TV 20) to the TV 20 (or the mobile terminal 10) may be overwritten on the Web page (for update) displayed on the TV 20 (or the mobile terminal 10), or may be displayed in another window maintaining the Web page on the TV 20 (or the mobile terminal 10).

Figure 2B:
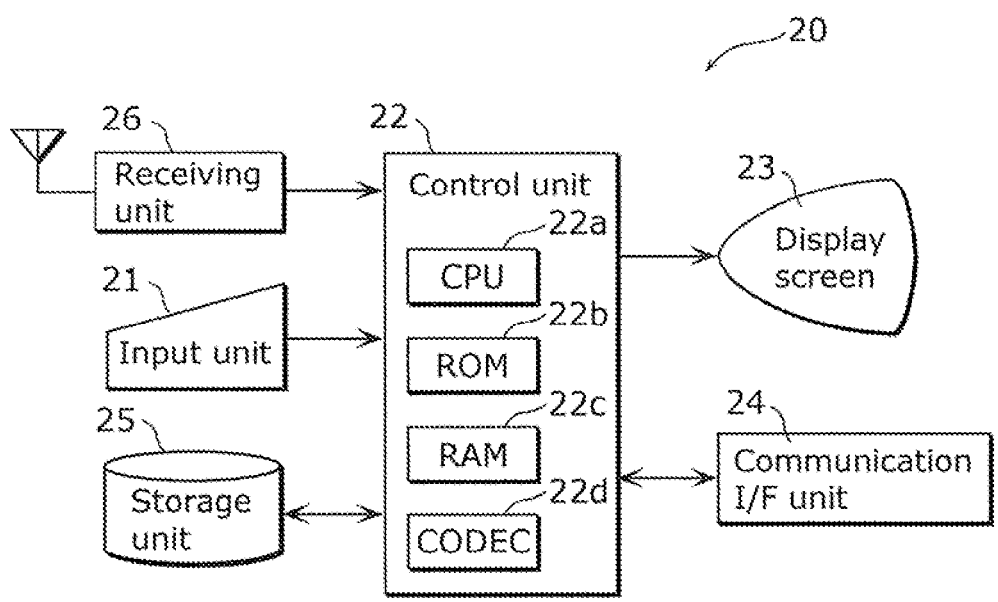
FIG. 2B is a block diagram showing a structure of a TV in FIG. 1.

FIG. 2B is a block diagram showing a structure of the TV 20 in FIG. 1. The TV 20 is an example of a display device (here, a television broadcast receiver) for a device linkage with the mobile terminal 10. The TV 20 includes an input unit 21, a control unit 22, a display screen 23, a communication interface (I/F) unit 24, a storage unit 2, a receiving unit 26.

The receiving unit 26 is a processing unit which receives content of a broadcast program or the like, and is for example a tuner for broadcast or an external signal input unit which receives a video signal from an external device such as a recording and reproducing device.

The input unit 21 is a processing unit which receives a user instruction, and is for example a receiving unit which receives a signal from a remote controller (not shown), an operation button, or the like.

The display screen 23 is a display screen such as a liquid crystal panel, and includes a display memory such as a video memory.

The communication I/F unit 24 is an example of a communication interface unit for communicating with the mobile terminal 10 through the wireless router 30 or accessing the Internet 31, and is for example an interface card for wireless LAN.

The storage unit 25 is an example of a storage unit for storing content to be displayed on the display screen 23. The storage unit is for example an embedded or attachable/detachable non-volatile memory for storing content of a photograph, a video, a voice or sound, a Web page etc.

The control unit 22 is a processing unit which, according to a user instruction through the input unit 21, (i) displays, on the display screen 23, content including a broadcast program received by the receiving unit 26, content stored in the storage unit 25, content received through the communication I/F unit 24, and (ii) stores the content received through the communication I/F unit 24. The control unit 22 includes a CPU 22a, a ROM 22b, a RAM 22c, and a CODEC 22d.

The ROM 22b is a read-only memory storing an Operating System (OS), programs such as an application program, and data which realize functions of the control unit 22. The CPU 22a is a processor which executes the program stored in the ROM 22b. The RAM 22c is a temporary storage area which functions as a working area for the CPU 22a to execute the program. The CODEC 22d is a video and audio compression decoder. The CODEC 22d (i) decodes encoded content received by the receiving unit 26 or encode content read from the storage unit 25, and (ii) encodes content received by the receiving unit 26 or encode content received by the communication I/F unit 24 and stores the encoded content in the storage unit 25. Here, all or part of the aforementioned programs and data may be stored in the storage unit 25 which functions as the non-volatile memory.

In addition, the control unit 22 displays the content received by the receiving unit 26 on the display screen 23, and notifies, through the communication I/F unit 24, the mobile terminal 10 that the content is displayed on the display screen 23. Next, when receiving a transmission request for the content displayed on the display screen 23 from the mobile terminal 10 through the communication I/F unit 24, the control unit 22 transmits the content to the mobile terminal 10 through the communication I/F unit 24. In this way, the content displayed on the TV 20 is notified to the mobile terminal 10, and the content is downloaded from the TV 20 to the mobile terminal 10, in response to the transmission request from the mobile terminal 10.

Next, descriptions are given of operations by a communication system 1 in this embodiment configured as described above.

Figure 3:
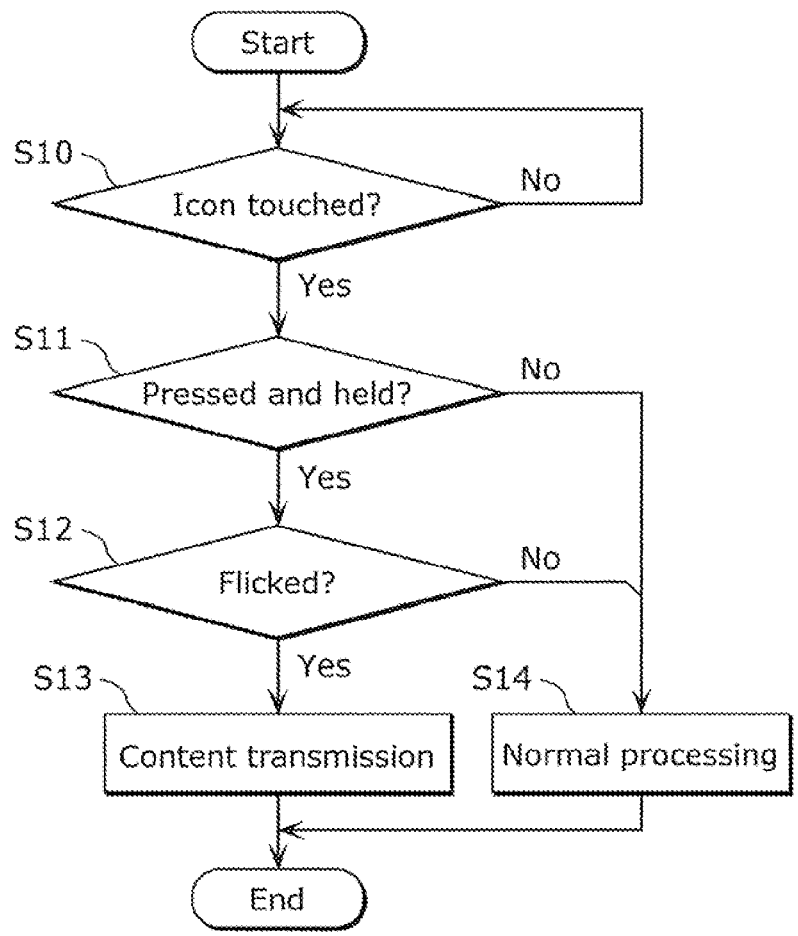
FIG. 3 is a flowchart of basic operations (a device linkage method without guide display) of the mobile terminal in content transmission.
Figure 4:
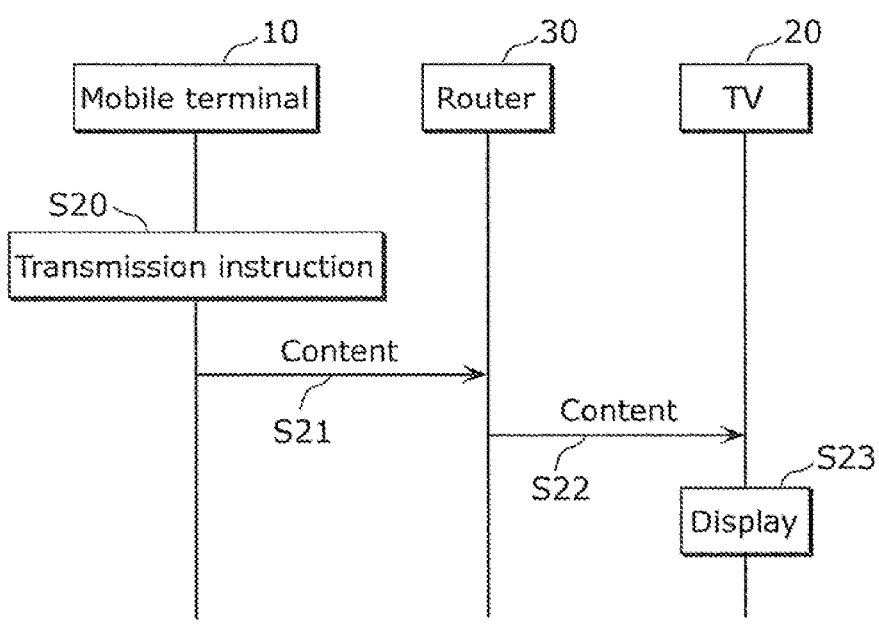
FIG. 4 is a diagram showing a communication sequence in a communication system in the content transmission shown in FIG. 3.
Figure 5:
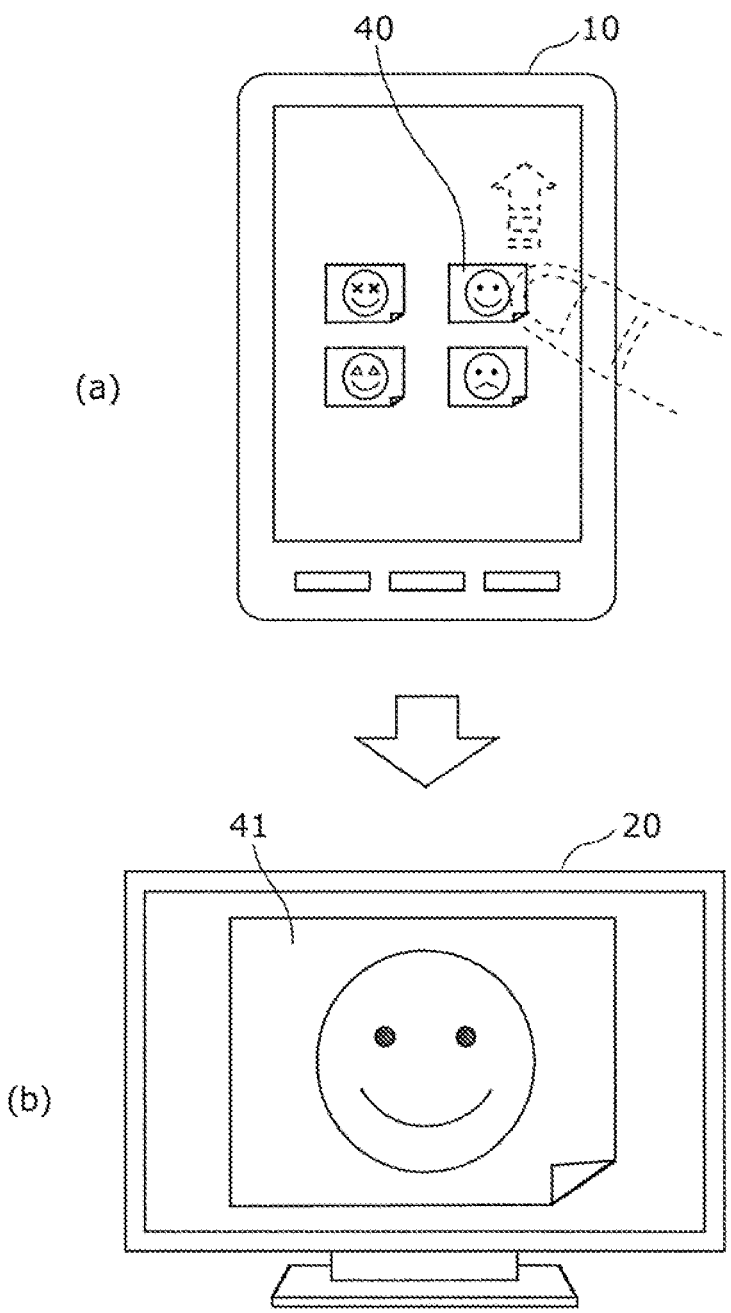
FIG. 5 is a diagram showing an example of display by the mobile terminal and the TV in the content transmission shown in FIG. 3.

FIG. 3 is a flowchart of basic operations (a device linkage method without guide display) of the mobile terminal 10 in content transmission. FIG. 4 is a diagram showing a communication sequence in the communication system 1 in the content transmission. FIG. 5 is a diagram showing an example of display by the mobile terminal 10 and the TV 20 in the content transmission.

It is assumed that the control unit 12 is currently displaying, on the display screen 13b, a content icon which is an icon associated with a content stored in the storage unit 15. The control unit 12 determines whether or not a content icon (in the case where a plurality of content icons are displayed, one of the content icons) displayed on the display screen 13b is touched, using the touch pad 13a (S10 in FIG. 3). Here, such determination is repeated (No in S10 of FIG. 3) until the content icon is touched (Yes in S10 of FIG. 3).

When determining that the content icon is touched, the control unit 12 subsequently determines whether or not the content icon is pressed and held, using the touch pad 13a (S11 in FIG. 3). For example, the control unit 12 determines whether or not the content is touched for 0.5 second or more.

As a result, when determining that the content is not pressed continuously in other word, is pressed shortly) (No in S11 of FIG. 3), the control unit 12 performs a normal operation corresponding to the short press (for example, determines that the content is tapped, and displays, on the display screen 13b, the content associated with the content icon) (S14 in FIG. 3).

On the other hand, when determining that the content is pressed and held (Yes in S11 of FIG. 3), the control unit 12 subsequently determines whether or not the content icon is flicked, using the touch pad 13a (S12 in FIG. 3). For example, the control unit 12 determines whether or not a trace operation (here, any trace direction is possible) is performed on the touch pad 13a at a certain speed or more.

As a result, when determining that the pressed and held content icon is not flicked (No in S12 of FIG. 3), the control unit 12 performs a normal process (for example, selecting a content icon) corresponding to a mere long press (S14 in FIG. 3).

On the other hand, when determining that the pressed and held content icon is flicked (Yes in S12 of FIG. 3), the control unit 12 recognizes presence of an instruction for transmitting the content associated with the content icon (S20 in FIG. 4), reads the content from the storage unit 15, and transmits it to the TV 20 through the communication I/F unit 14 and the wireless router 30 (S13 in FIG. 3, S21 and S22 in FIG. 4). The content transmitted from the mobile terminal 10 is then displayed (or is reproduced if the content is a video content) by the TV 20 in which the predetermined application program is being executed (S23 in FIG. 4). In other words, the control unit 22 of the TV 20 receives the content transmitted from the mobile terminal 10 through the communication I/F unit 24, and displays the content on the display screen 23.

In this way, as shown in FIG. 5, the user can display or reproduce the content 41 associated with the content icon 40 on the large display screen of the TV 20 ((b) in FIG. 5) only by performing the simple operations of pressing and holding and then flicking the content icon 40 displayed on the mobile terminal 10 ((a) in FIG. 5). In FIG. 5, (a) shows an example where a user performs an operation of an upward flick on the display screen 13*b*. However, in this example, the same process is performed irrespective of a flick direction.

Figure 6:
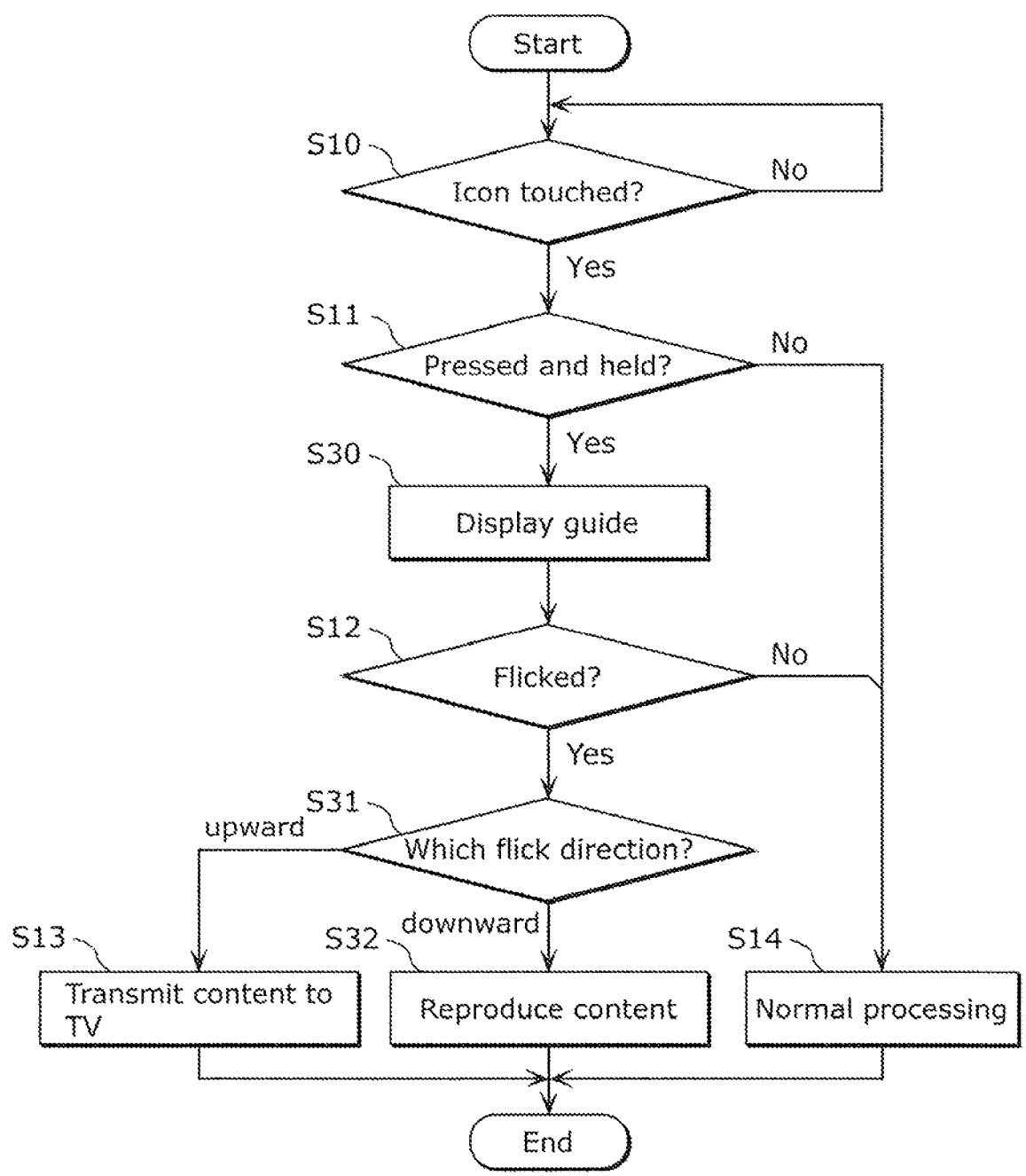
FIG. 6 is a flowchart of other operations (a device linkage method with guide display) of the mobile terminal in content transmission.
Figure 7:
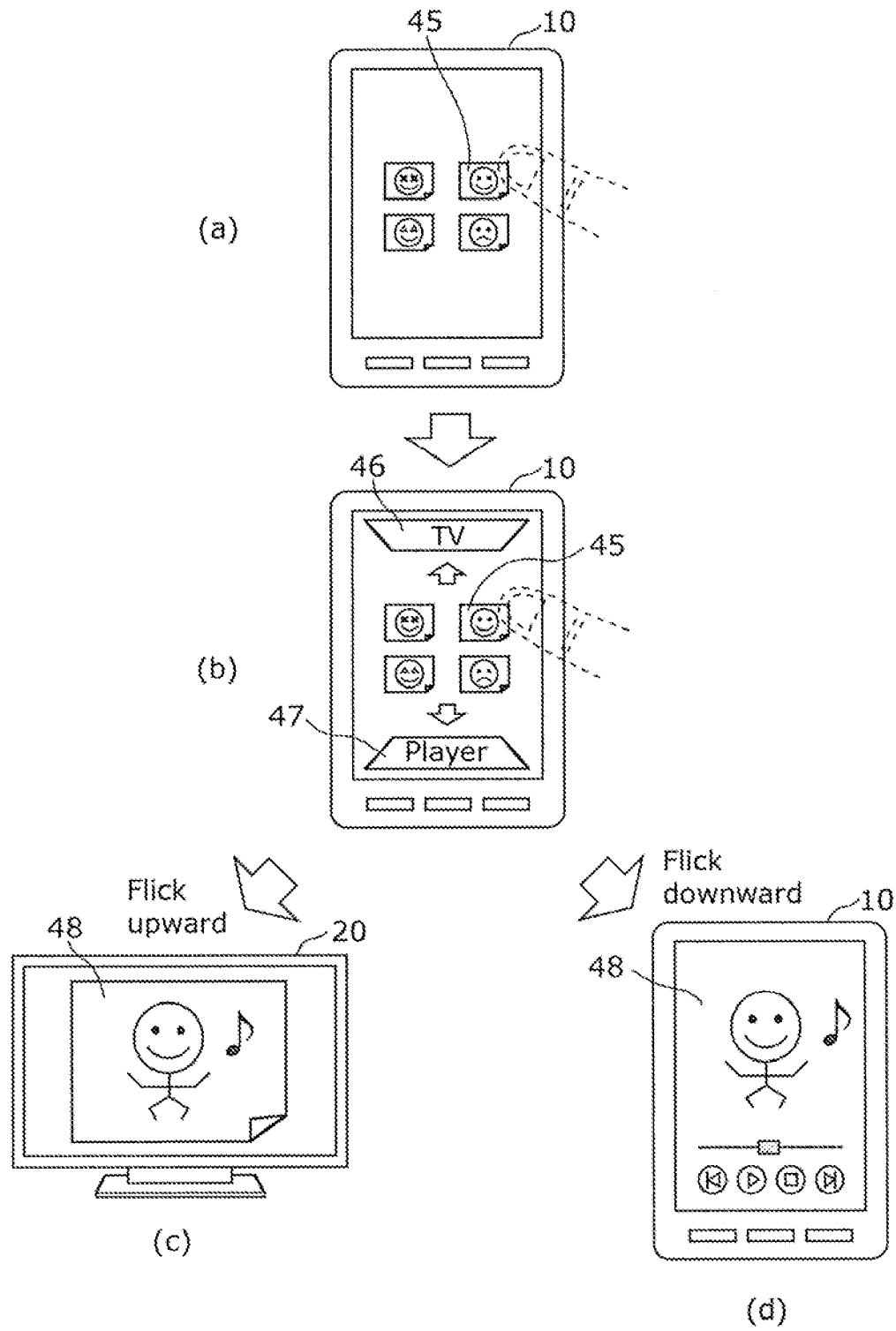
FIG. 7 is a diagram showing an example of display by the mobile terminal and the TV in the content transmission shown in FIG. 6.

FIG. 6 is a flowchart of other operations (a device linkage method with guide display) of the mobile terminal 10 in content transmission. FIG. 7 is a diagram showing an example of display by the mobile terminal 10 and the TV 20 in the content transmission.

As known by comparison between FIG. 6 and FIG. 3, operations (steps in FIG. 6) performed here correspond to a flowchart obtained by adding Steps S30, S31, and S32 to the flowchart of FIG. 3. Hereinafter, operations different from the steps in FIG. 3 are described.

As shown in FIG. 7, when determining that the touched content icon 45 is pressed and held (Yes in S11 of FIG. 6), the control unit 12 next displays, as guide display, a TV icon 46 which is an icon associated with the TV 20 at an upper part (upper end) of the display screen 13*b*, and displays a mobile terminal icon 47 which is an icon associated with the mobile terminal 10 at a lower part (lower end) of the display screen 13*b* (S30 of FIG. 6).

When determining that the pressed and held content icon 45 is flicked (Yes in S12 of FIG. 6), the control unit 12 next determines the flick direction (S31 of FIG. 6).

When determining that the pressed and held content icon 45 is flicked toward the TV icon 46 ("upward" in S31 of FIG. 6), the control unit 12 reads the content 48 associated with the content icon 45 from the storage unit 15, and transmits it to the TV 20 through the communication I/F unit 14 and the wireless router 30. The content 48 transmitted from the mobile terminal 10 is then displayed (or is reproduced if the content is a video content) by the TV 20 in which the predetermined application program is being executed ((c) in FIG. 7). In other words, the control unit 22 of the TV 20 receives the content transmitted from the mobile terminal 10 through the communication I/F unit 24, and displays the content on the display screen 23.

On the other hand, when determining that the pressed and held content icon 45 is flicked toward the mobile terminal icon 47 ("downward" in S31 of FIG. 6), the control unit 12 reads the content 48 associated with the content icon 45 from the storage unit 15, and displays the content (or reproduces if the content is a video content) on the display screen 13*b* ((d) in FIG. 7).

In this way, it is only necessary for the user to flick the content icon 45 in the direction according to the guide display provided when pressing and holding the content icon 45 displayed on the mobile terminal 10 so as to display or reproduce the associated content on the large display screen of the TV 20 or a display screen on the mobile terminal 10.

Figure 8:
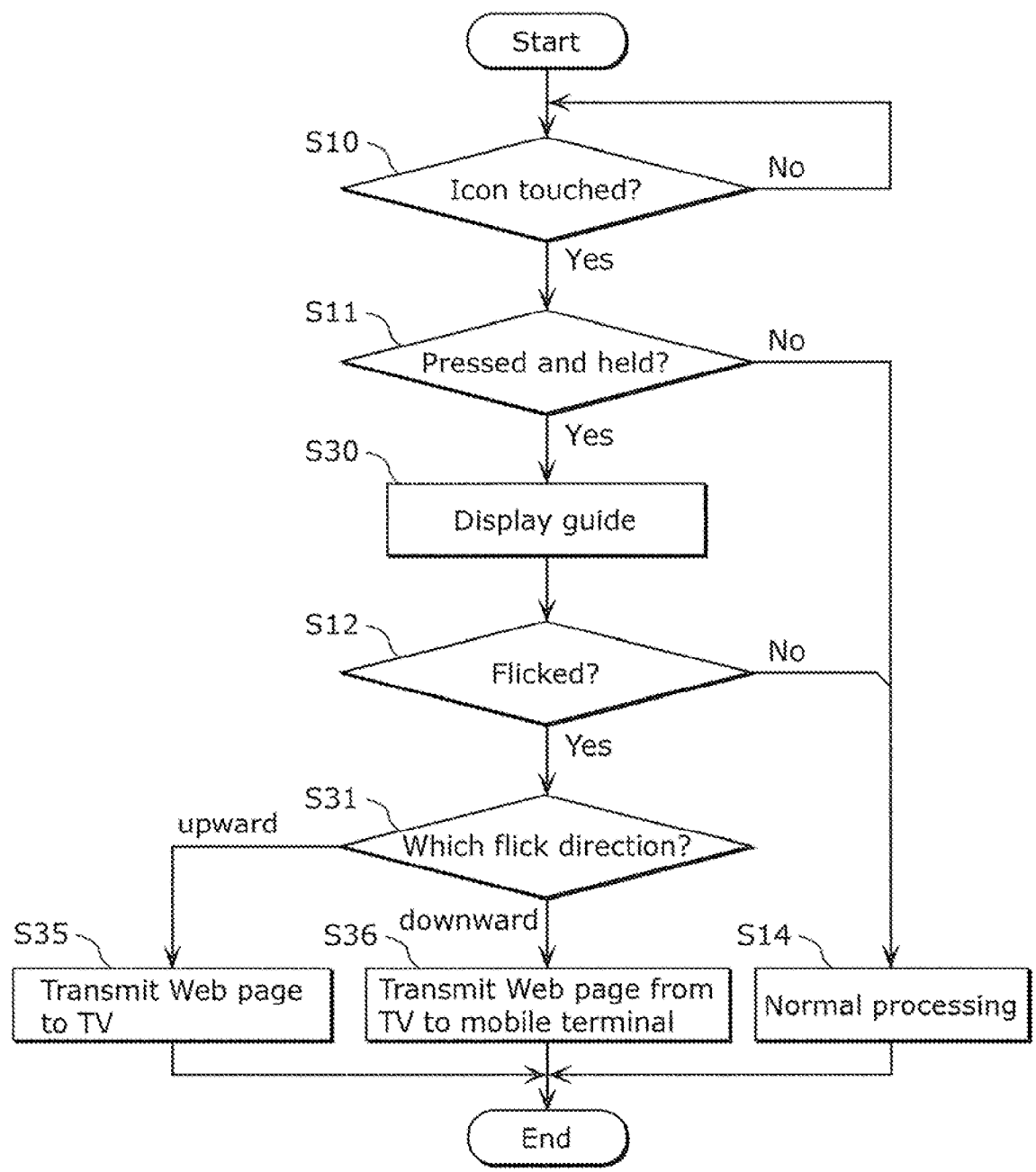
FIG. 8 is a flowchart of other operations (a device linkage method in the case where a Web page is displayed on each of the mobile terminal and the TV) of the mobile terminal in content transmission.
Figure 9:
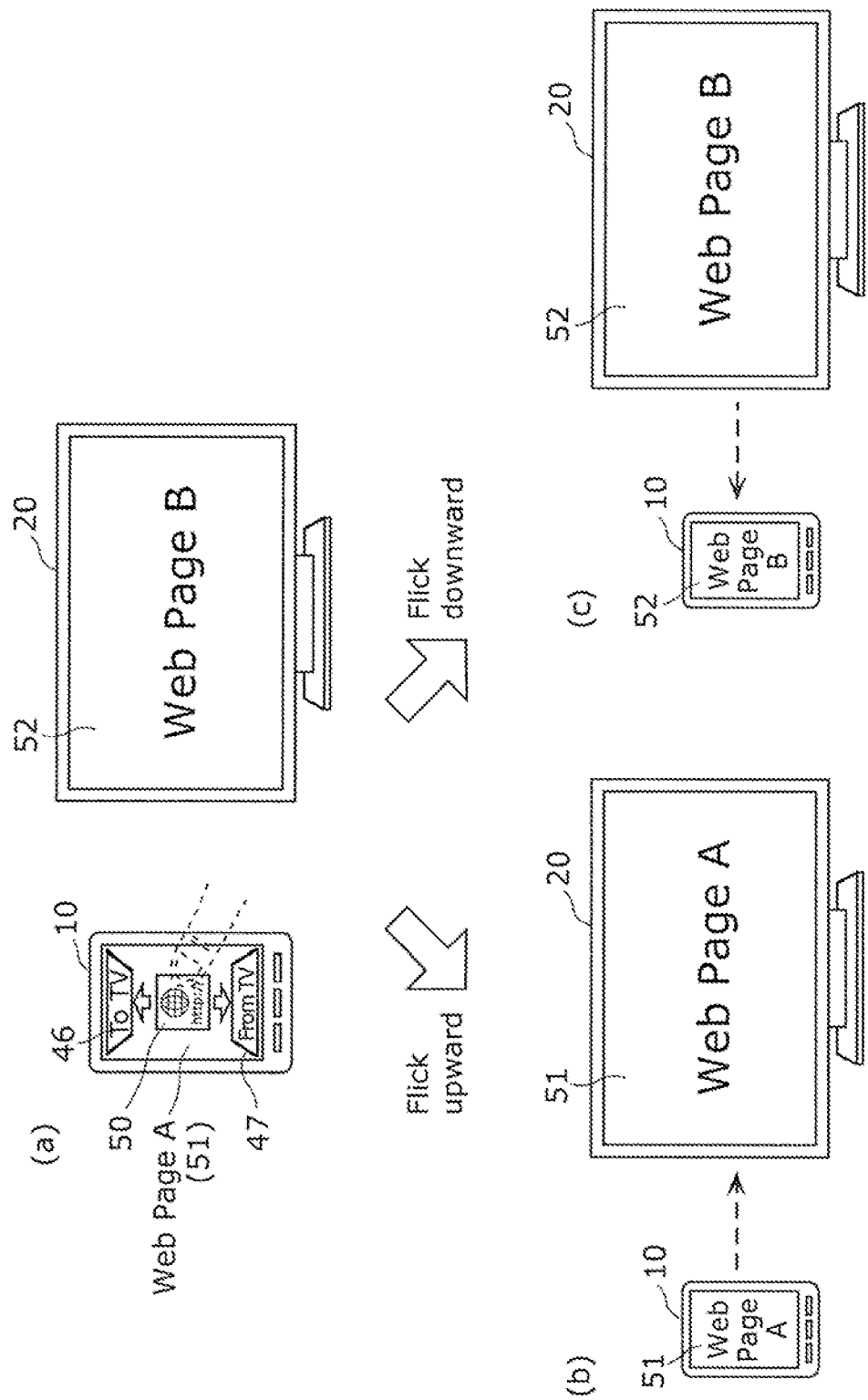
FIG. 9 is a diagram showing an example of display by the mobile terminal and the TV in the content transmission shown in FIG. 8.

FIG. 8 is a flowchart of other operations (a device linkage method in the case where a Web page is displayed on each of the mobile terminal 10 and the TV 20) of the mobile terminal 10 in content transmission. FIG. 9 is a diagram showing an example of display by the mobile terminal 10 and the TV 20 in the content transmission.

As known by comparison between FIG. 8 and FIG. 6, operations (steps in FIG. 8) performed here correspond to a flowchart obtained by replacing Step S13 and S32 of FIG. 6 with Steps S35 and S36, respectively. Hereinafter, operations different from the steps in FIG. 6 are described.

As shown in (a) of FIG. 9, it is assumed now that the mobile terminal 10 and the TV 20 access the Internet through the wireless router 30, a Web page 51 is displayed on the mobile terminal 10, and a Web page 52 is displayed on the TV 20.

In this case, as shown in (a) of FIG. 9, a content icon 50 associated with the Web page 51 is displayed pop-up as guide display when the Web page 51 is pressed and held.

When determining that the currently being displayed Web page 51 is pressed and held and then is flicked toward the TV icon 46, in other words, the content icon 50 displayed pop-up is flicked toward the TV icon 46 ("upward" in S31 of FIG. 8), the control unit 12 transmits the URL of the Web page 51 stored in the RAM 12*c* or the storage unit 15 to the TV 20 through the communication I/F unit 14 and the wireless router 30. Consequently, upon receiving the URL, the control unit 22 of the TV 20 accesses the Internet based on the URL to obtain the Web page 51, displays the Web page 51 (or reproduces the Web page 51 if it is a video) ((b) of FIG. 9) by overwriting (for update) the obtained Web page 51 on the Web page 52 displayed before, or providing the Web page 51 in a window other than the window for the Web page 52.

On the other hand, when determining that the currently being displayed Web page 51 is pressed and held and then is flicked toward the mobile terminal icon 47, ("downward" in S31 of FIG. 8), the control unit 12 gives the TV 20 an instruction for transmitting the URL of the Web page 52 displayed on the TV 20, so that the Web page 52 displayed on the TV 20 can be displayed on the display screen 13*b*. Upon receiving the instruction, the control unit 22 of the TV 20 notifies the mobile terminal 10 of the URL of the Web page 52 displayed on the display screen 23. After receiving the URL transmitted from the TV 20, the control unit 12 of the mobile terminal 10 accesses the Internet 31 based on the URL to obtain the Web page 52, and displays the Web page 52 (or reproduces the Web page 52 if it is a video) ((c) of FIG. 9) by overwriting (for update) the obtained Web page 52 on the Web page 51 displayed before, or providing the Web page 52 in a window other than the window for the Web page 51.

In this way, it is only necessary for the user to press and hold and then flick the Web page 51 displayed on the mobile terminal 10 so that the user can transmit the Web page 51 displayed on the mobile terminal 10 to the TV 20 and display the Web page 51 on the TV 20, and transmit the Web page 52 displayed on the TV 20 to the mobile terminal 10 and display the Web page 52 on the mobile terminal 10. Thus, the user can continue browsing the Internet using the TV 20 in succession to the browsing using the mobile terminal 10, and can continue browsing the Internet using the mobile terminal 10 in succession to the browsing using the TV 20.

Here, exchange of Web pages shown in FIGS. 8 and 9 have been described assuming that the Web pages are displayed respectively on the mobile terminal 10 and the TV 20. However, content items other than Web pages may be exchanged. For example, when detecting that content or a content icon displayed on the mobile terminal 10 is pressed and held and then is flicked downward, the control unit 12 may determine whether or not the content or the content associated with the content icon is a Web page. The control unit 12 may transmit the URL of the Web page displayed on the TV 20 to the mobile terminal 10 when determining that the content is the Web page, and may display the content (or reproduce the content if it is a video) on the mobile terminal 10 when determining that the content is not the Web page.

In the exchange of the Web pages shown in FIGS. 8 and 9, the URL of the Web page is transmitted between the mobile terminal 10 and the TV 20. However, transmission targets are not limited thereto, and may be Web pages as they are, or image data generated by rasterizing the Web pages.

Variations of Embodiment

Next, variations of the embodiment are described.

In the example shown in FIG. 9, when the Web page 51 or the content icon 50 displayed pop-up is flicked upward. The URL of the Web page 51 displayed on the mobile terminal 10 is transmitted to the TV 20. However, link information described in the Web page 51 may be transmitted to the TV 20.

Figure 10:
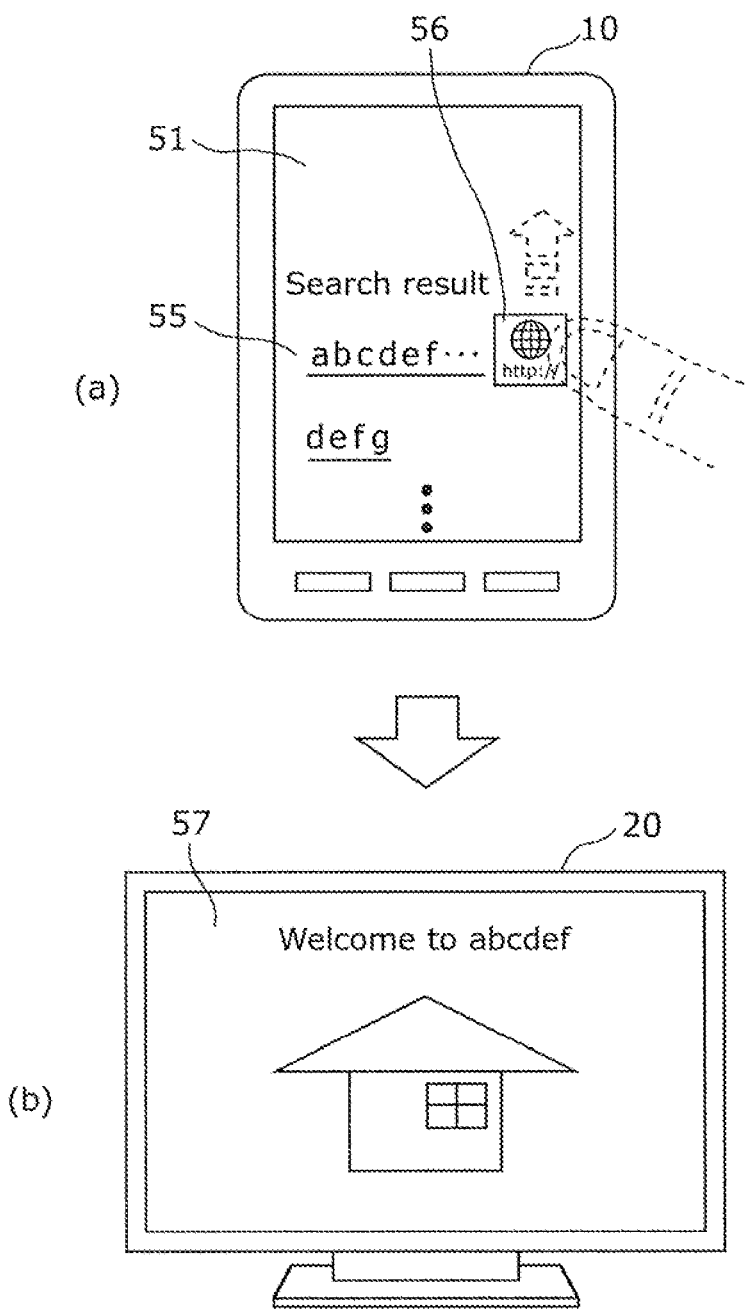
FIG. 10 is a diagram illustrating a first variation of the embodiment of the present disclosure.

For example, as shown in FIG. 10 showing a first variation of the embodiment, link information 55 (the URL which is location information of the link destination, or information associated with the URL) in the Web page 51 displayed on the mobile terminal 10 is touched, the control unit 12 displays pop-up a link icon 56 associated with the link information 55, and when detecting that the link icon 56 is pressed and held and then is flicked, transmits the URL associated with the link icon 56 to the TV 20. Upon receiving the URL transmitted from the mobile terminal 10, the control unit 22 of the TV 20 accesses the URL (a communication device located on the Internet 31) through the communication I/F unit 24 and the wireless router 30, obtains the Web page 57 located thereat, and displays it on the display screen 23 of the TV 20 ((b) of FIG. 10).

In this way, the link destination (a Web page 57) of the Web page 51 displayed on the mobile terminal 10 is displayed on the TV 20. Thus, the user can keep accessing the Internet 31 using the TV 20 having the large display screen.

In addition, in the example shown in FIG. 5, when the content icon 40 is pressed and held and then is flicked, a content item 41 associated with the content icon 40 is transmitted to the TV 20. However, a folder icon including a plurality of content items may be pressed and held and then is flicked.

For example, as shown in FIG. 11 showing a second variation of the embodiment, it is assumed that a folder icon 60 associated with a folder including a plurality of content items 60a to 60c is currently being displayed. The content items 60a to 60c are, for example, images stored in the storage unit 15. The folder icon 60 are icons associated with the plurality of content items 60a to 60c.

At this time, when the pressed and held folder icon 60 is flicked toward the TV icon 46 ((a) in FIG. 11), the control unit 12 reads the plurality of content items 60a to 60c associated with the folder icon 60 from the storage unit 15, and transmits it to the TV 20 through the communication I/F unit 14 and the wireless router 30. The plurality of content items 60a to 60c transmitted from the mobile terminal 10 are displayed on the TV 20 in which the predetermined application program is being executed (for example, reproduced sequentially as a slide show ((b) to (d) of FIG. 11, or displayed at sight). When the pressed and held folder icon 60 is flicked toward the mobile terminal icon 47, the control unit 12 reads the plurality of content items 60a to 60c associated with the folder icon 60 from the storage unit 15, and displays them on the display screen 13b (for example, reproduced sequentially as a slide show or displayed at sight).

In this way, it is only necessary for the user to press and hold and then flick the single icon (folder icon 60) so as to display the plurality of content items stored in the mobile terminal 10 on the TV 20, or display them on the mobile terminal 10, without repeating the same operation by the number of the content items that the user want to transmit.

Figure 12A:
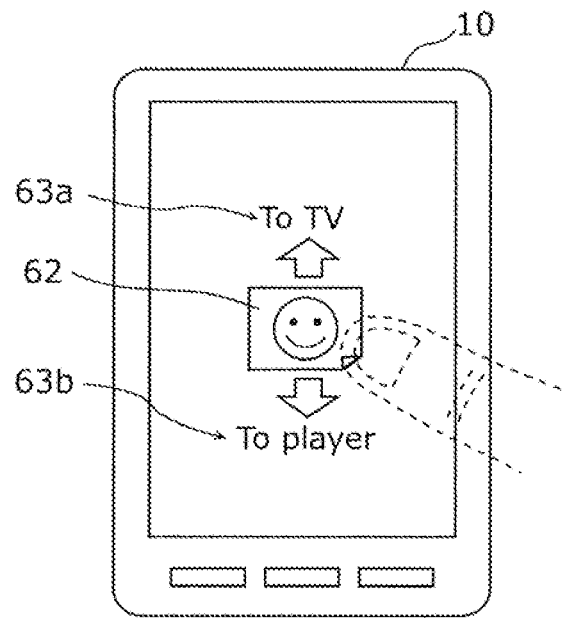
FIG. 12A is a diagram illustrating a third variation of the embodiment of the present disclosure.

In addition, although the guide display is provided at the upper end and the lower end in the example of guide display shown in (b) of FIG. 7, such guide display may be provided around the touched or pressed and held icon. For example, as shown in FIG. 12A showing a third variation of the embodiment, when the content icon 62 is touched or pressed and held, guides corresponding to flick directions (here guides 63a and 63b each composed of an arrow and characters) may be displayed.

In this way, even in the case of a mobile terminal, such as a tablet PC, which has a comparatively large display screen, guides are displayed around a focused icon. Thus, the user can instantly know an association between a flick direction and a succeeding operation.

In this embodiment, the icon is flicked with a finger, but an icon may be flicked with two fingers. At this time, the mobile terminal 10 may operate differently depending on the number of fingers used for the operation.

Figure 12B:
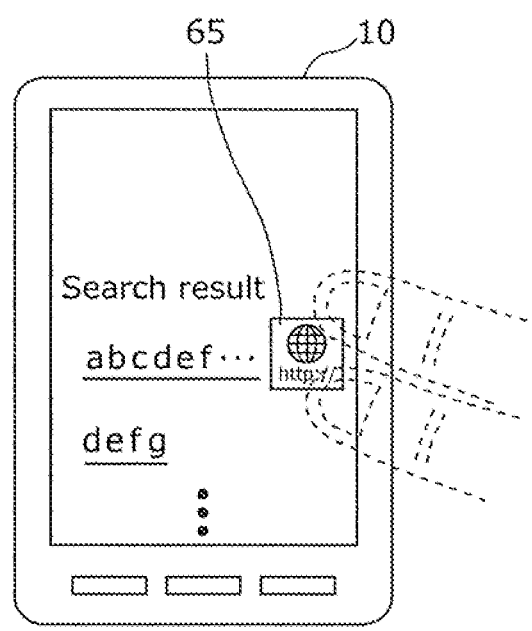
FIG. 12B is a diagram illustrating a fourth variation of the embodiment of the present disclosure.

For example, as in FIG. 12B showing a fourth variation of the embodiment, when link information (or a link icon 65 displayed pop-up by a touch or a long press) in the Web page is pressed and held and then is flicked with a finger, the control unit 12 transmits the URL of the Web page displayed on the mobile terminal 10 to the TV 20. On the other hand, when link information (or a link icon 65 displayed pop-up by a touch or a long press) in the Web page is pressed and held and then is flicked with two fingers, the control unit 12 transmits the URL associated with the link information (or the link icon 56) to the TV 20. Upon receiving the URL transmitted from the mobile terminal 10, the control unit 22 of the TV 20 accesses the Internet 31 so as to obtain the Web page showing the URL, and displays the Web page on the display screen 23 of the TV 20.

Consequently, the user can display the Web page displayed on the mobile terminal 10 also on the TV 20 by the one-finger long press and flick, and can display the Web page at the link destination of the Web page displayed on the mobile terminal 10 also on the TV 20 by the two-finger long press and flick. Alternatively, when the link information is pressed and held and then is flicked with two fingers while the Web page is being displayed on the mobile terminal 10, the control unit 12 may transmit the URL of the Web page displayed on the mobile terminal 10 to the TV 20, and register the URL in a bookmark at the TV 20. In this way, the user can switch various kinds of operations only by changing the number of fingers used to touch the display unit 13.

As other examples for changing operations by the mobile terminal 10 depending on an operation performed with a finger or an operation performed with two fingers (or more), the mobile terminal 10 may perform operations below.

Figure 13A:
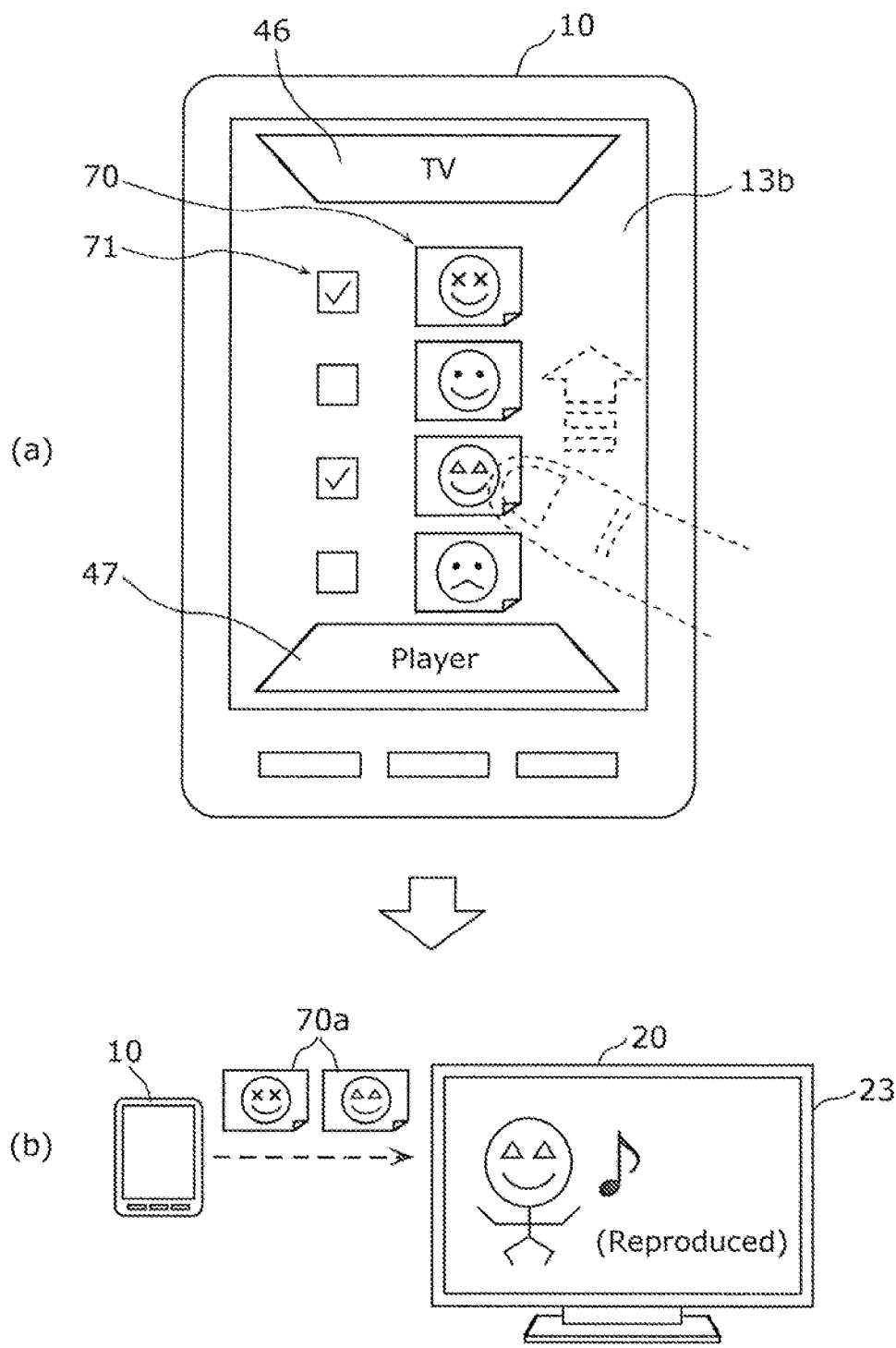
FIG. 13A is a diagram showing an example of an operation performed with a finger in a fifth variation (an example of an upload operation) in the embodiment.

First, a description is given of an upload operation, that is, transmitting content from the mobile terminal 10 to the TV 20. Each of FIGS. 13A and 13B is a diagram showing a fifth variation (an example of an upload operation) of the embodiment. FIG. 13A shows an example of an operation performed with a finger, and FIG. 13B shows an example of an operation performed with two fingers.

It is assumed now that a content icon 70 associated with content stored in the storage unit 15 is displayed on the display screen 13b of the mobile terminal 10, as shown in each of (a) of FIG. 13A and (a) of FIG. 13B.

As shown in FIG. 13A, when detecting that the content icon 70 displayed on the display screen 13b is pressed and held with a finger and then is flicked (upward) in a third direction (here, a direction in which the TV icon 46 is displayed) ((a) of FIG. 13A), the control unit 12 of the mobile terminal 10 reads content 70a associated with the content icon 70 from the storage unit 15, and transmits the read content 70a together with a display (reproduction) command to the TV 20 through the communication I/F unit 14 and the wireless router 30 ((b) of FIG. 13A). As a result, at the TV 20 which receives the content 70a and the display (reproduction) command, the control unit 22 executes the display (reproduction) command, and thereby displays the content 70a (or reproduces the content 70a if it is a video and audio content) by executing the display (reproduction) command. Although the read content 70a is transmitted together with the display (reproduction) command to the TV 20 in the above description, the content 70a may be transmitted in response to a content transmission request from the control unit 22 of the TV 20 after the control unit 12 of the mobile terminal 10 transmits the display (reproduction) command to the TV 20.

On the other hand, as shown in FIG. 13B, when detecting that the content icon 70 displayed on the display screen 13b is pressed with two fingers and then is flicked (upward) in a third direction (here, a direction in which the TV icon 46 is displayed) ((a) in FIG. 13B), the control unit 12 of the mobile terminal 10 reads the content 70a associated with the content icon 70 from the storage unit 15, and transmits the read content 70a together with a storage command to the TV 20 through the communication I/F unit 14 and the wireless router 30 ((b) in FIG. 13B). As a result, at the TV 20 which receives the content 70a and the storage command, the control unit 22 executes the storage command, and thereby stores the received content 70a in the storage unit 25 by executing the storage command. Although the read content 70a is transmitted together with the storage command to the TV 20 in the above description, the content 70a may be transmitted in response to a content transmission request from the control unit 22 of the TV 20 after the control unit 12 of the mobile terminal 10 transmits the storage command to the TV 20.

As described above, in this variation, the mobile terminal 10 transmits the associated content 70a to the TV 20 and causes the TV 20 to display the content 70a when detecting that the displayed content icon 70 is pressed and held with the finger and then is flicked in the third direction, and the mobile terminal 10 transmits the associated content 70a to the TV 20 and causes the TV 20 to store the content 70a when detecting that the displayed content icon 70 is pressed with the two fingers and then is flicked in the third direction. In this way, the user can upload the content inside the mobile terminal 10 from the mobile terminal 10 to the TV 20 by the one-finger flick or the two-finger flick in the particular direction, and switch between post-upload processes performed by the TV 20, that are, display (reproduction) of the content on the TV 20 and storage of the content in the TV 20.

In each of the examples shown in (a) of FIG. 13A and (a) of FIG. 13B, on the display screen 13b of the mobile terminal 10, a plurality of content icons 70 associated respectively with the plurality of content items are displayed and one or more content icons which are operation targets are selected from among the plurality of content icons 70 using check boxes 71. In this case, the one or more content icons assigned with check marks in their check boxes collectively become the processing targets. For example, the user can assign the check marks to the plurality of content icons by tapping the check boxes 71 thereof, and perform the aforementioned one or two-finger operations on one of the plurality of content icons.

In this way, the user can perform a single operation on the plurality of content icons instead of performing the processes respectively on the plurality of content icons.

Here, the check boxes 71 may be displayed outside the content icons 70, or may be displayed inside the content icons 70 (to be superimposed on part of the content icons). In addition, when any of the plurality of content icons with the check marks is pressed with the finger or the two fingers, the fact that the plurality of content icons are currently being selected may be clearly displayed (for example, an icon showing, as a group, the plurality of content icons may be displayed).

Figure 14B:
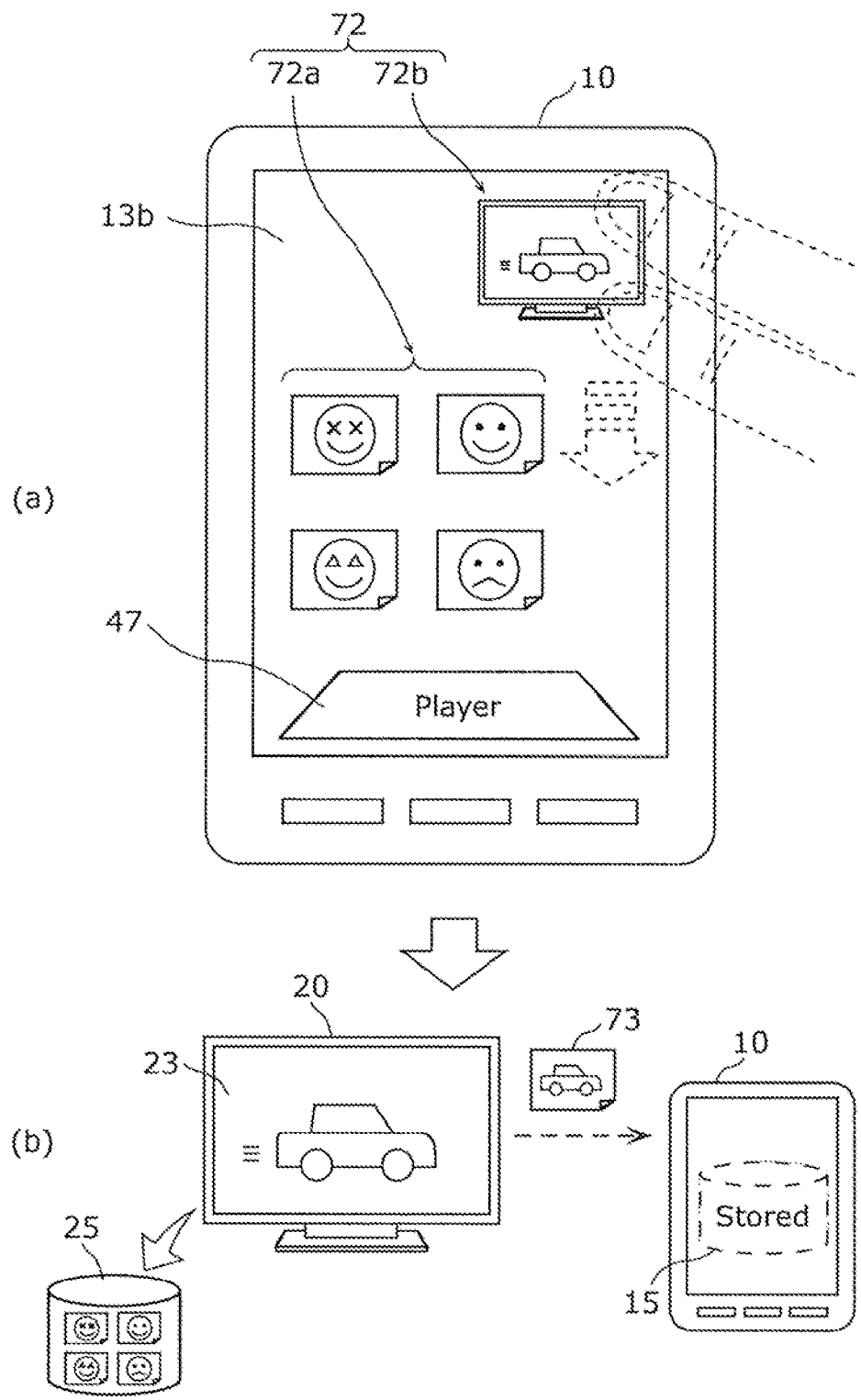
FIG. 14B is a diagram showing an example of an operation performed with two fingers (an example of a download operation) in the sixth variation.
Figure 15:
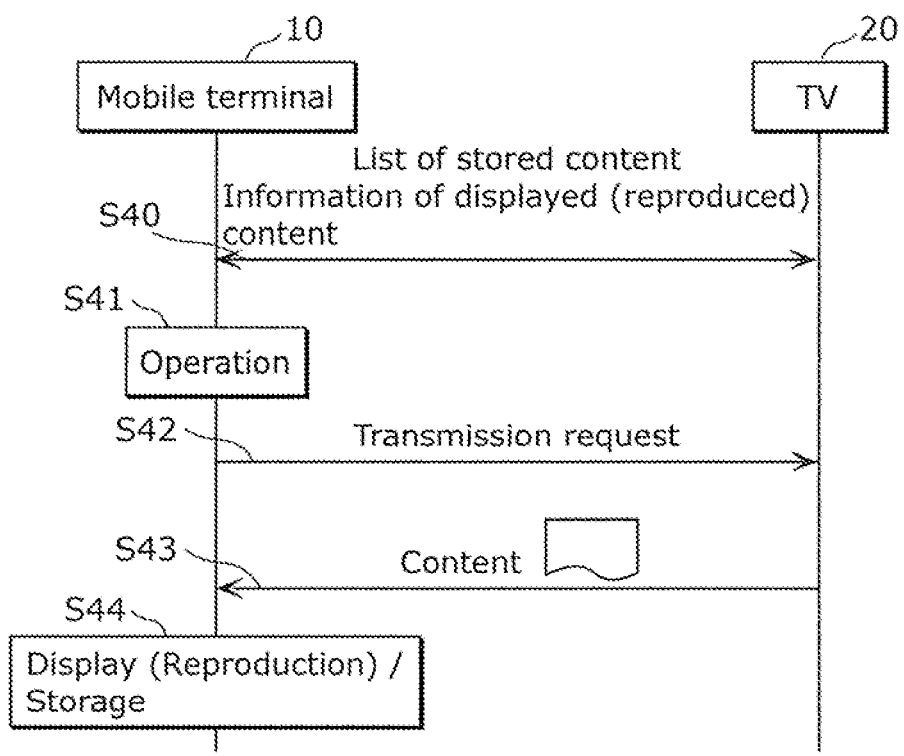
FIG. 15 is a diagram showing a communication sequence in a communication system in the sixth variation.

Next, a description is given of a download operation of transmitting content from the TV 20 to the mobile terminal 10. Each of FIGS. 14A and 14B is a diagram showing a sixth variation (an example of a download operation) of the embodiment. FIG. 14A shows an example of an operation performed with a finger, and FIG. 14B shows an example of an operation performed with two fingers. FIG. 15 is a diagram showing a communication sequence in a communication system 1 in the sixth variation. Here for simplicity, FIG. 15 does not illustrate a router 30.

It is assumed now that the following are displayed on the display screen 13b of the mobile terminal 10 as shown in each of (a) of FIG. 14A and (a) of FIG. 14B: a content icon 72a associated with content stored in the storage unit 25 of the TV 20 and an icon 72b associated with the content displayed (reproduced) on the display screen 23 of the TV 20 at the time point (hereinafter these icons 72a and 72b are collectively referred to as "display device content icons 72"). As for the icon 72a, the mobile terminal 10 requests the TV 20 to transmit a list of content items stored in the TV 20, obtains the list from the TV 20, and displays the icon 72a on the display screen 13b based on the obtained list (S40 of FIG. 15). In addition, as for the icon 72b, the TV 20 periodically transmits, to the mobile terminal 10, information identifying content that is displayed (reproduced) on the display screen 23 of the TV 20 (or provides a notification that content is displayed on the display screen 23) Upon receiving the information or the notification, the mobile terminal 10 displays the received information or the icon 72b corresponding to the notification on the display screen 13b (S40 of FIG. 15).

As shown in FIG. 14A, when detecting that the display device content icon 72 displayed on the display screen 13b is pressed and held with the finger and then is flicked (downward) in the fourth direction (here, in the direction in which the mobile terminal icon 47 is displayed), or is tapped ((a) of FIG. 14A, S41 of FIG. 15), the control unit 12 of the mobile terminal 10 transmits the transmission request for the content 73 associated with the display device content icon 72 to the TV 20 (S42 of FIG. 15). Upon receiving the transmission request, the control unit 22 of the TV 20 reads the requested content 73 from the storage unit 25 of the TV 20 or the memory for display, and transmits the read content 73 to the mobile terminal 10 ((b) of FIG. 14A, S43 of FIG. 15). Upon receiving the transmitted content 73, the control unit 12 of the mobile terminal 10 displays the content 73 (or reproduces it if it is video or audio content) on the display screen 13b (S44 of FIG. 15).

On the other hand, as shown in FIG. 14B, when detecting that the display device content icon 72 displayed on the display screen 13b is pressed and held with the two fingers and then is flicked (downward) in the fourth direction (here, in the direction in which the mobile terminal icon 47 is displayed) ((a) of FIG. 14B, S41 of FIG. 15), the control unit 12 of the mobile terminal 10 transmits the transmission request for the content 73 associated with the display device content icon 72 to the TV 20 (S42 of FIG. 15). Upon receiving the transmission request, the control unit 22 of the TV 20 reads the requested content 73 from the storage unit 25 or the memory for display, and transmits the read content 73 to the mobile terminal 10 ((b) of FIG. 14B, S43 of FIG. 15). Upon receiving the transmitted content 73, the control unit 12 of the mobile terminal 12 stores the content 73 in the storage unit 15 (S44 of FIG. 15).

In this way, in this variation, the content stored in the TV 20 and the display device content icon 72 which is the icon associated with the content displayed on the TV 20 are displayed on the display screen 13b of the mobile terminal 10. Upon detecting that the display device content icon 72 is pressed, the control unit 12 of the mobile terminal 10 obtains the content 73 associated with the display device content icon 72. More specifically, when detecting that the display device content icon 72 is tapped or pressed and held with the finger and then is flicked in the fourth direction, the control unit 12 of the mobile terminal 10 obtains the content 73 associated with the display device content icon 72 from the TV 20, and displays the content 73 on the display screen 13b, and when detecting that the display device content icon 72 is flicked in the fourth direction with the two fingers and then is flicked in the fourth direction, the control unit 12 obtains the content 73 associated with the display device content icon 72 from the TV 20, and stores the content 73 in the storage unit 15. In this way, the user can download the content in the TV 20 from the TV 20 to the mobile terminal 10 by the flick with the finger or the two fingers in the particular direction, and switch between post-download processes performed by the mobile terminal 10, that are, display (reproduction) of the content on the mobile terminal 10 and storage of the content in the mobile terminal 10.

In addition, the control unit 22 of the TV 20 in this variation displays the content received by the receiving unit 26 on the display screen 23, and notifies, through the communication I/F unit 24, the mobile terminal 10 of the fact that the content is displayed on the display screen 23. Next, when receiving a transmission request for the content displayed on the display screen 23 from the mobile terminal 10 through the communication I/F unit 24, the control unit 22 of the TV 20 transmits the content to the mobile terminal 10 through the communication I/F unit 24. In this way, the user can download the content displayed (reproduced) on the TV 20 at the time point to the mobile terminal 10 at hand, and views the content by displaying (reproducing) the content on the mobile terminal 10 at hand.

Here, in this variation, on the display screen 13b of the mobile terminal 10, both of the icon 72a associated with the content stored in the storage unit 25 of the TV 20 and the icon 72b associated with the content displayed (reproduced) on the display screen 23 of the TV 20 at the time point are displayed. However, only one of the icons 72a and 72b is displayed instead. Such a case is a case where no content is stored in the storage unit 25 of the TV 20, or where the content is displayed (reproduced) on the display screen 23 of the TV 20 at the time point.

As described above, according to the embodiment and the variations thereof, it is possible to realize a device linkage between the mobile terminal and an external device by simple operations of pressing and holding and then flicking an icon thereon, without mounting any special hardware such as touch sensors on both of the front and back surfaces of the mobile terminal.

Other Embodiments

Although the mobile terminal, the television broadcast receiver, and the device linkage method according to the present disclosure have been described above, the present disclosure is not limited to the embodiment and variations thereof. The present disclosure includes embodiments obtained by adding various kinds of modifications that persons skilled in the art may arrive at to the embodiment and variations, and embodiments obtainable by arbitrarily combining the various kinds of functions and procedures described in the embodiment and variations.

For example, in the display example shown in FIG. 7, guide display is provided immediately after the content icon 45 is pressed and held. However, the guide display may be provided immediately before the content icon 45 is touched.

In addition, in each of the embodiment and the variations thereof, the guides are displayed at the upper and lower parts of the display screen 13b. However, a guide may be displayed only one of the parts, or in one or more directions (right, left, upper right, lower right, upper left, or/and lower left).

In addition, the directions such as the upper and lower directions on the display screen 13b may be (absolute) directions which do not depend on the orientation of the mobile terminal 10, or may be (relative) directions which depend on the orientation of the mobile terminal 10. For example, when the orientation of the mobile terminal changes (for example, from portrait to landscape), the displayed content on the display screen is rotated accordingly, and thus the (relative) upper and lower directions may be defined with respect to the displayed content on the display screen.

In addition, in each of the embodiment and the variations thereof, the external device which is the transmission destination of the content etc. is the display device (TV 20). However, the external device may be a device of another kind such as an audio reproduction device. For example, when a content icon associated with music content is pressed and held and then is flicked on the mobile terminal 10, the mobile terminal 10 may transmit the music content to the audio reproduction device which is the external device, and the audio reproduction device may reproduce the music content. In short, the content that is a transmission target is not limited to an image only, and may be music, a script for controlling the device, etc.

In addition, when the icon is pressed and held with a finger or two fingers, and the finger or two fingers are released after remaining at the same coordinate or around the same coordinate for a certain time duration (for example, 2 seconds) on the touch pad 13a, the control unit 12 may regard the operation is cancelled, and return to a normal state (in which the display unit 13 is untouched).

In addition, although the embodiment and the variations thereof describe examples in each of which guide display is provided or is not provided, an operation that is to be employed among the exclusive operations may be determined by setting in advance in the mobile terminal 10 (by storing setting information in the storage unit 15).

In addition, a "flick" operation in each of the embodiment and the variations thereof may be an operation called a "swipe". Both of the operations are operations of tracking a target on the display screen in a particular direction with one or more fingers touched on the target. Thus, it is possible to employ such a swipe operation in any of the embodiment and variations. Accordingly, the "flick" in any of the embodiment and variations may be read as a "swipe" or a "flick or swipe".

In addition, although specification of a plurality of content icons using check marks is described in the fifth variation, such specification may be applied in any of the embodiment and variations.

In addition, the number of fingers and one or more functions assigned thereto are arbitrary. For example, in the case of using three fingers, functions of reproducing and storing a target at the same time may be assigned, or a function for transmitting a raw GUI which is currently being displayed on the mobile terminal 10 to the TV 20 and causing the TV 20 to display the GUI. As a technique for transmitting the GUI, a function using WiFiMiracast® may be used.

The embodiments and variations have been described above as examples of the techniques according to the present disclosure. The attached drawings and detailed embodiments are provided for illustrative purposes only.

Accordingly, the structural elements described in the attached drawings and detailed embodiments may include not only structural elements which are essential for solving the problem but also structural elements which are not essential for solving the problem but are provided for illustrating the techniques. Therefore, the non-essential structural elements described in the attached drawings and/or the detailed embodiments should not be instantly acknowledged to be essential structural elements.

Since the above embodiments and variations are intended to illustrate the techniques in the present disclosure, it is possible to make various kinds of modifications, replacements, additions, deletions etc within the scope of the Claims or the equivalents.

The subject of the present disclosure is applicable as a mobile terminal and a television broadcast receiver each mounting a touch panel, for example, as a smart phone, a tablet PC, and a television receiver, and especially as a mobile terminal and a television broadcast receiver each having a function of linking with an external device which is connected through a communication path.

REFERENCE SIGNS LIST

1 Communication system
10 Mobile terminal
11 Button
12, 22 Control unit
12a, 22a CPU
12b, 22b ROM
12c, 22c RAM
13 Display unit
13a Touch pad
13b, 23 Display screen
14, 24 Communication I/F unit
15, 25 Storage unit
20 TV (television broadcast receiver)
21 Input unit
22d CODEC
26 Receiving unit
30 Wireless router
31 Internet
40, 45, 50, 62, 70 Content icon
41, 48, 60a to 60c, 70a, 73 Content
46 TV icon
47 Mobile terminal icon
51, 52, 57 Web page
55 Link information
56, 65 Link icon
60 Folder icon
63a, 63b Guide (display)
71 Check box
72 (72a, 72b) Display device content icon

The invention claimed is:

1. A mobile terminal which is connected to a display device through a communication path, the mobile terminal comprising:
a communication interface unit for communicating with the display device;
a storage unit configured to store pieces of content to be displayed on the display device;
a display unit having a touch pad and a display screen; and
a control unit configured to display a plurality of content icons associated respectively with the pieces of content on the display screen,
wherein when the control unit detects that a content icon in the plurality of content icons is pressed and held with a finger over a predetermined time duration and then is flicked on the display unit without taking the finger off the display unit, the control unit is configured to read, from the storage unit, a piece of content included in the pieces of content and associated with the content icon in the plurality of content icons and transmit the piece of content to the display device through the communication interface unit, so that the piece of content is displayed on the display device,
the storage unit is further configured to store a first Web page, and
the control unit is further configured to:
read the first Web page from the storage unit and display the first Web page on the display screen;
when detecting that the first Web page is pressed and held and then is flicked in a first direction on the display unit, transmit location information of the first Web page to the display device through the communication interface unit, so that the first Web page is displayed on the display device; and
when detecting that the first Web page is pressed and held and then is flicked in a second direction on the display unit, the control unit is further configured to:
direct the display device to transmit location information of the second Web page displayed on the display device so that the second Web page is displayed on the display screen;
receive the location information transmitted from the display device through the communication interface unit;
obtain the second Web page based on the received location information, and
display the second Web page on the display screen.

2. A mobile terminal which is connected to a display device through a communication path, the mobile terminal comprising:
a communication interface unit for communicating with the display device;
a storage unit configured to store pieces of content to be displayed on the display device;
a display unit having a touch pad and a display screen; and
a control unit configured to display a plurality of content icons associated respectively with the pieces of content on the display screen,
wherein when the control unit detects that a content icon in the plurality of content icons is pressed and held with a finger over a predetermined time duration and then is flicked on the display unit without taking the finger off the display unit, the control unit is configured to read, from the storage unit, a piece of content included in the pieces of content and associated with the content icon in the plurality of content icons and transmit the piece of content to the display device through the communication interface unit, so that the piece of content is displayed on the display device, and the control unit is further configured to:
display, on the display screen, a display device content icon which is an icon associated with at least one of content stored in the display device and content displayed on the display device; and
when detecting that the display device content icon is pressed, obtain the content associated with the display device content icon from the display device, and
wherein the control unit is further configured to:
when detecting that the display device content icon is pressed and held with a finger and then is flicked in a fourth direction, obtain, from the display device, the content associated with the display device content icon and display the content on the display screen; and
when detecting that the display device content icon is flicked with two fingers in the fourth direction, obtain, from the display device, the content associated with the display device content icon and store the content in the storage unit.

3. A device linkage method for a mobile terminal which is connected to a display device through a communication path, wherein the mobile terminal includes a communication interface unit for communicating with the display device, a storage unit configured to store pieces of content to be displayed on the display device, a display unit having a touch pad and a display screen, and a control unit configured to display a plurality of content icons associated respectively with the pieces of content on the display screen, the device linkage method comprising:
when the control unit detects that a content icon in the plurality of content icons is pressed and held with a finger over a predetermined time duration and then is flicked on the display unit without taking the finger off the display unit, reading, from the storage unit, a piece of content included in the pieces of content and associated with the content icon in the plurality of content icons and transmitting the piece of content to the display device through the communication interface unit, so that the piece of content is displayed on the display device,
storing in the storage unit a first Web page;
reading, using the control unit, the first Web page from the storage unit and displaying the first Web page on the display screen;
when the control unit detects that the first Web page is pressed and held and then is flicked in a first direction on the display unit, transmitting location information of the first Web page to the display device through the communication interface unit, so that the first Web page is displayed on the display device;
when the control unit detects that the first Web page is pressed and held and then is flicked in a second direction on the display unit, directing the display device to transmit location information of the second Web page displayed on the display device so that the second Web page is displayed on the display screen;
receiving the location information transmitted from the display device through the communication interface unit; and
obtaining the second Web page based on the received location information, and displaying the second Web page on the display screen.

4. A device linkage method for a mobile terminal which is connected to a display device through a communication path, wherein the mobile terminal includes a communication interface unit for communicating with the display device, a storage unit configured to store pieces of content to be displayed on the display device, a display unit having a touch pad and a display screen, and a control unit configured to display a plurality of content icons associated respectively with the pieces of content on the display screen, the device linkage method comprising:
when the control unit detects that a content icon in the plurality of content icons is pressed and held with a finger over a predetermined time duration and then is flicked on the display unit without taking the finger off the display unit, reading, from the storage unit, a piece of content included in the pieces of content and associated with the content icon in the plurality of content icons and transmitting the piece of content to the display device through the communication interface unit, so that the piece of content is displayed on the display device;
displaying, on the display screen, a display device content icon which is an icon associated with at least one of content stored in the display device and content displayed on the display device;
when the control unit detects that the display device content icon is pressed, obtaining the content associated with the display device content icon from the display device;
when the control unit detects that the display device content icon is pressed and held with a finger and then is flicked in a fourth direction, obtaining, from the display device, the content associated with the display device content icon and displaying the content on the display screen; and
when the control unit detects that the display device content icon is flicked with two fingers in the fourth direction, obtaining, from the display device, the content associated with the display device content icon and storing the content in the storage unit.

* * * * *